United States Patent [19]

Weber et al.

[11] 4,431,755

[45] Feb. 14, 1984

[54] RUBBER COMPOSITION COMPRISING PHYLLOSILICATE MINERALS, SILANES, AND QUATERNARY AMMONIUM SALTS

[75] Inventors: Kenneth E. Weber, North Hollywood; Harold Mukamal, Seal Beach, both of Calif.

[73] Assignee: Standard Oil Company (Indiana), Chicago, Ill.

[21] Appl. No.: 398,994

[22] Filed: Jul. 16, 1982

[51] Int. Cl.$^3$ .......................... C08L 9/06; C08K 3/36; C08K 5/17
[52] U.S. Cl. ................................. 523/203; 523/212; 523/213; 523/216; 523/333; 523/334; 524/447; 524/449; 524/450; 524/451; 524/571; 524/575; 260/762; 260/763
[58] Field of Search ............... 523/220, 212, 213, 333, 523/334, 203, 216; 524/451, 449, 447, 450, 575, 571; 260/756, 762, 763

[56] References Cited

U.S. PATENT DOCUMENTS

| | | | |
|---|---|---|---|
| 3,686,113 | 8/1972 | Burke | 523/351 |
| 3,689,452 | 9/1972 | Burke | 524/96 |
| 3,840,382 | 10/1974 | Burke | 524/334 |
| 3,888,815 | 6/1975 | Bessmer et al. | 524/780 |
| 3,998,778 | 12/1976 | Berg et al. | 523/334 |
| 4,137,367 | 1/1979 | Sample et al. | 428/405 |
| 4,156,677 | 5/1979 | Williams et al. | 524/572 |
| 4,229,333 | 10/1980 | Wolff et al. | 524/262 |
| 4,292,234 | 9/1981 | Borel | 260/762 |
| 4,297,145 | 10/1981 | Wolff et al. | 524/263 |
| 4,348,311 | 9/1982 | Machorat et al. | 523/212 |

FOREIGN PATENT DOCUMENTS 1374709  11/1974  United Kingdom .

*Primary Examiner*—Melvyn I. Marquis
*Assistant Examiner*—Herbert J. Lilling
*Attorney, Agent, or Firm*—James R. Henes; William T. McClain; William H. Magidson

[57] ABSTRACT

A rubber composition containing a phyllosilicate mineral filler is disclosed.

91 Claims, 4 Drawing Figures

RUBBER COMPOSITION COMPRISING PHYLLOSILICATE MINERALS, SILANES, AND QUATERNARY AMMONIUM SALTS

BACKGROUND OF THE INVENTION

This invention relates generally to a rubber composition and more particularly concerns a rubber composition containing a phyllosilicate mineral filler.

The precise formulation of any rubber compound depends on its intended end use. Different end uses require very specific mechanical properties. To a degree, the choice of filler and agent for coupling the rubber and filler determines the mechanical properties of the rubber compound. For example, the use of organosilane coupling agents generally of formula I shown hereinbelow, in conjunction with phyllosilicate minerals as extending or reinforcing fillers in natural or synthetic rubber compositions, is well known in the art—especially as represented by Sample et al., U.S. Pat. No. 4,260,498, which in its entirety is specifically incorporated herein by reference. Alexander et al., U.S. Pat. No. 2,801,186 and Doran et al., U.S. Pat. No. 3,737,334 also contain illustrative disclosures. In such cases, the organosilane serves to improve the overall mechanical properties of the rubber compositions. In use, certain functional organic groups of the organosilane hydrolyze in the presence of moisture typically found on the surface of the minerals to form silanols which react with or otherwise condense in the presence of silica, clay or metal oxide surfaces. To be effective in this respect, the silane coupling agent must be reactive with both the rubber and filler. The coupling agent may be applied to the filler in a separate pretreatment step, or it may be added directly during compounding of the rubber.

Quaternary ammonium salts have also been disclosed for use with phyllosilicate mineral fillers or pigments. Technical Report 35-T entitled "Factors Affecting the Dispersion of Ultra-Fine Particle Size Mistron Talcs in Water and the Effects of Wetting and Dispersion Agents" and published in 1956 by Sierra Talc & Clay Company (now Cyprus Mines Corporation) describes quaternary ammonium salts as effective dispersants for talc in water. Technical Report 48-T entitled "Mistrons in Hydrocarbon Solvents—Effects of Cationic Surfactants" and published in 1958 by the former Sierra Talc & Clay Company describes certain quaternary ammonium salts as dispersants of talc in plastics, rubber and other polymeric dispersions. German Offenlegungsschrift No. 2,224,003 which issued in 1972 contains a very similar disclosure. E. K. Lotakova, G. A. Blokh, E. V. Tsipenyuk, I. G. Lebed, T. G. Blokh, F. D. Ovcharenko, N. G. Vasileo, A. D. Chugai and V. A. Mashchenko, "Properties of Rubbers Filled with Modified Kaolins," Kozh.-Obuvn. Prom-st. Vol. 18(6), pp. 45-7 (1976) discloses the reinforcement of rubbers with kaolin modified with benzyldimethylalkylammonium chloride. N. S. Gilinskaya, G. A. Sankina, M. S. Skorobogatova, "Effect of the Chemical Nature of Dihydric Phenols and Quaternary Ammonium Salts on the Properties of Vulcanized Rubbers Made from the Rubber SKR-26," Kauch. Rezina, Vol. 3, pp. 10-12 (1980) discloses the vulcanization of rubber in the presence of quaternary ammonium salts.

Brown, U.S. Pat. No. 3,024,126 discloses rubber compositions containing reinforcing silica, a silane and a quaternary ammonium salt. Mukamal et al., copending U.S. patent application Ser. No. 297,175 filed Aug. 28, 1981, discloses rubber compositions containing a phyllosilicate mineral, a silane of formula I below and a primary, secondary or tertiary amine having a specific structural formula.

The use of a phyllosilicate mineral filler in conjunction with both an organosilane and a quaternary ammonium salt has not heretofore been disclosed for use in rubber compositions. Furthermore, in spite of the known efficacy of organosilanes or quaternary ammonium salts in rubber compositions, efforts continue to discover alternatives or improvements to known organosilanes and quaternary ammonium salts in rubber compositions. A problem of using such additives as organosilanes in rubber compositions is their relatively high cost. It is therefore desirable to reduce the amount of such agents in rubber compositions without also reducing their effect on the mechanical properties of the rubber compositions.

OBJECTS OF THE INVENTION

Accordingly, it is a general object of the present invention to provide a rubber composition containing a phyllosilicate mineral filler and an additive package wherein the effect of the additive package on the mechanical properties of the composition is maximized and the amount of each component of the additive package is minimized.

Other objects and advantages of the invention will become apparent upon reading the following detailed description and appended claims.

SUMMARY OF THE INVENTION

The present invention is a rubber composition formed according to an improved rubber compounding process. The improved process comprises mixing and substantially uniformly dispersing in A, B, C, D or E natural or synthetic rubber. (A) comprises (1) a particulate Agent G at a level of from about 5 to about 200 parts per hundred parts by weight of rubber (phr), (2) Agent H at a level of from about 0.005 to about 15 phr, and (3) Agent I at a level of from about 0.005 to about 15 phr. (B) comprises (1) a particulate adduct of Agents G and H having a median particle size in the range of from about 0.01 to about 20 microns and present at a level such that the portion thereof contributed from Agent G is at a level of from about 5 to about 200 phr and the portion thereof contributed from Agent H is at a level of from about 0.005 to about 15 phr, and (2) Agent I at a level of from about 0.005 to about 15 phr. (C) comprises (1) a particulate adduct of Agents G and I having a median particle size in the range of from about 0.01 to about 20 microns and present at a level such that the portion thereof contributed from Agent G is at a level of from about 5 to about 200 phr and the portion thereof contributed from Agent I is at a level of from about 0.005 to about 15 phr, and (2) Agent H at a level of from about 0.005 to about 15 phr. (D) comprises a particulate adduct of Agents G, H, and I having a median particle size in the range of from about 0.01 to about 20 microns and present at a level such that the portion thereof contributed from Agent G is at a level of from 5 to about 200 phr, the portion thereof contributed from Agent H is at a level of from about 0.005 to about 15 phr and the portion thereof contributed from Agent I is at a level of from about 0.005 to about 15 phr. (E) comprises (1) a particulate adduct of Agents G and H having a median particle size in the range of from about 0.01 to about 20 microns and present at a level such that the portion thereof contributed from Agent G is at a level of from about 2.5 to about 100 phr and the portion thereof contributed from Agent H is at a level of from about 0.005 to about 15 phr, and (2) a particulate adduct of Agents G and I having a median particle size in the range of from about 0.01 to about 20 microns and present at a level such that the portion thereof contributed from Agent G is at a level of from about 2.5 to about 100 phr and the portion thereof contributed from Agent I is at a level of from about 0.005 to about 15 phr.

In this context, Agent G comprises phyllosilicate mineral particles having a median particle size in the range of from about 0.01 to about 20 microns. Agent H comprises an organosilane of formula I or II.

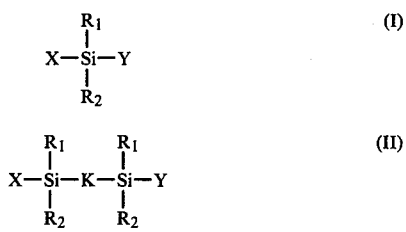

In formulas I and II, X is a group which is, or which upon hydrolysis forms a group which is, capable of reacting with a reactive site on the phyllosilicate mineral particles so as to form a bond between the organosilane of formula I or II and the phyllosilicate mineral particles. Y in formulas I and II is an alkyl, aryl, or alkyl-substituted aryl group containing from 1 to 40 carbon atoms and bears a functional group capable of reacting with a reactive site on the rubber so as to form a bond between the organosilane of formula I or II and the rubber. $R_1$ and $R_2$ in formulas I and II are the same or different and are each selected from the group consisting of the groups described by X and Y, an alkyl group containing from 1 to 20 carbon atoms, an aryl group, and an alkyl-substituted aryl group wherein the alkyl substituents contain a total of from 1 to 20 carbon atoms. K in formula II is an alkylenyl group containing from 1 to 20 carbon atoms or an alkyl sulfide or polysulfide group containing from 1 to 6 sulfur atoms and from 2 to 20 carbon atoms.

Agent I comprises a quaternary ammonium salt.

The present invention is also a rubber composition comprising a substantially uniform dispersion in natural or synthetic rubber of A, B, C, D, E or F, wherein (F) comprises (B), (C), (D) or (E) above, wherein the particulate adduct in (B), (C) or (D) or at least one of the particulate adducts in (E) is also an adduct with the rubber.

The present invention is additionally a particulate adduct of Agents G, H and I having a median particle size in the range of from about 0.01 to about 20 microns wherein the concentration levels of Agents H and I are each in the range of from about 0.1 to 7.5 weight percent, based on the weight of Agent G.

BRIEF DESCRIPTION OF THE DRAWINGS

For a more complete understanding of this invention, reference should now be made to the accompanying drawings and to the embodiments described below by way of examples of the invention. In the drawings.

Figure 1:
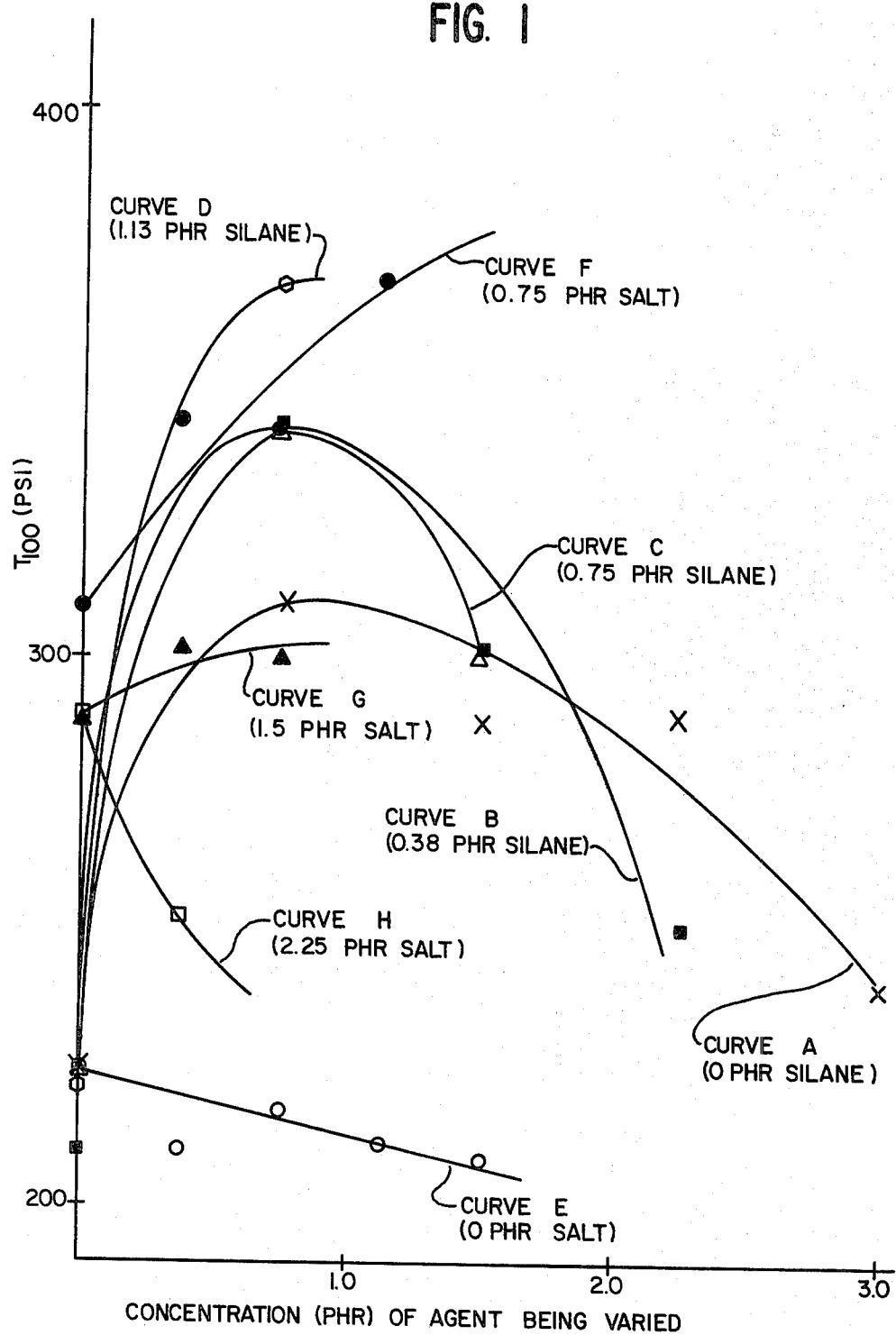
FIG. 1 is a series of plots illustrating the variation of the tensile strength of a rubber composition at 100 percent elongation as a function of the concentrations of 3-methacryloxypropyltrimethoxysilane and 1-methyl-1-oleyl amido ethyl-2-oleyl imidazolinium methyl sulfate in one set of embodiments of the composition of this invention.

It should be understood, of course, that the invention is not intended to be limited to the particular embodiments to which FIGS. 1–4 pertain.

DETAILED DESCRIPTION

According to the present invention, the aforesaid organosilane of formula I or II and quaternary ammonium salt can be employed in any convenient, conventional rubber compounding process to form the rubber composition of this invention. The rubber can suitably be natural rubber or a synthetic rubber such as polybutadiene rubber, polyisoprene rubber, styrene-butadiene rubber, nitrile rubber, butyl rubber, ethylene-propylene rubber, polyacrylate rubber, silicone rubber, chlorosulfonated polyethylene polymer rubber, or fluoroelastomer rubber. Preferably, the rubber is natural rubber, polybutadiene rubber, polyisoprene rubber or styrenebutadiene rubber. While any of the conventional curing agents known to the art can be employed in the method of compounding the rubber composition of this invention, typical curing agents include sulfur or sulfur-donating materials (in combination with suitable accelerators) and peroxide and other free radical producing agents. Preferably sulfur or a sulfur-donating material is employed.

The mineral filler employed in the composition of the present invention is a phyllosilicate mineral. As a general proposition, the silicates can be broadly divided into four groups according to crystal structure. The first group is made up of massive silicates with bonds more or less equally strong in three dimensions, giving rise to isodimensional particles. The second group is made up of lamellar or layer-type silicates (the phyllosilicates) in which the bonds are strong in two dimensions but relatively weak in the third, giving rise to layer-like structures. The third group is made up of needle-like or acicular-type silicates in which the bonds are predominantly strong in one dimension but relatively weak in the other two. The fourth group is made up of those silicates in which the crystal structure is so little developed that they may be classified as amorphous.

The composition of this invention concerns the aforesaid second group made up of lamellar phyllosilicate minerals. The phyllosilicates comprise the class of silicate minerals in which the silicon-oxygen tetrahedral groups are linked by sharing three oxygens of each tetrahedron with other tetrahedra so as to form sheets of indefinite extent, in which the ratio of silicon to oxygen is 2:5. Phyllosilicate minerals generally comprise a multiplicity of individual sheets, each having a particular crystalline structure where each of the sheets or layers is weakly attached to adjacent sheets by electrostatic attraction, Van Der Waals forces or hydrogen bonding involving four out of six hydroxyl groups per unit cell of the crystalline structure.

The numerous phyllosilicate minerals can be grouped into seven different subclasses. The first subclass is characterized by a two-layer structure and is made up of the kaolin group (kaolinite, dickite, nacrite, metahalloysite, halloysite, allophane and anauxite) and the septechlorite group (serpentine, chrysotile, antigorite, picrolite, lizardite, garnierite, pecoraite, greenalite, berthierite, bementite, amesite, grovesite and cronstedtite). The second subclass is characterized by primitive three-layer structures and comprises pyrophyllite, talc, minnesotaite and willemseite. The third subclass is made up of the micas (leucophyllite, celadonite, glauconite, phengite, alurgite, mariposite, illite, brammallite, hydromuscovite, muscovite, paragonite, roscoelite, fuchsite, ollacherite, sericite, taeniolite, polylithionite, lepidolite, zinnwaldite, manganophyllite, hendricksite, biotite, phlogopite, siderophyllite, annite, and lepidomelane). The fourth subclass is made up of the brittle micas (margarite, bityite, ephesite, xanthophyllite, clintonite and anandite). The fifth subclass is characterized by expandable three-layer structures and is made up of the smectites (montmorillonite, beidellite, nontronite, volchonskoite, hectorite, saponite, stevensite, sauconite, and pimelite) and vermiculite. The sixth subclass is characterized by four-layer structures and is made up of chlorite, thuringite, chamosite, ripidolite, brunsvigite, diabandite, sheridanite, clinochlore, penninite, ferrian, chromian, kammererite, manganian, pennantite, gonyerite, nimite and cookeite. The seventh subclass is made up of other layer structures also known as pseudolayer silicates and is made up of apophyllite, sanbornite, gillespite, cuprorivaite, palygorskite, sepiolite, prehnite, stilpnomelane, fenaksite, chrysocolla, krauskopfite, okenite, nekoite, stillwellite, ekanite, the melilite group (gehlenite, akermanite and hardystonite), leucophanite, meliphanite, datolite, gadolinite, homilite, leucosphenite, dalyite, astrophyllite, kupletskite, and niobophyllite.

In the composition of the present invention, the phyllosilicate preferably is a member of the kaolin group, a member of the mica group, a member of the group characterized by a primitive three-layer structure, a member of the group characterized by an expandable three-layer structure or a member of the group characterized by a four-layer structure, more preferably is kaolinite, muscovite, pyrophyllite, talc, vermiculite or chlorite, and most preferably is talc.

The median particle size of the phyllosilicate mineral particles in the rubber composition of this invention, and of the phyllosilicate mineral particles introduced in the preparation of the rubber composition of this invention, is in the range of from about 0.01 micron, preferably from about 0.1 micron, to about 20 microns, preferably to about 5 microns. If the phyllosilicate mineral particles are introduced in the preparation of the rubber composition of this invention in the form of their adducts with at least one of the organosilane of formula I or II and the quaternary ammonium salt, the median particle size of the adducts is in the range of from about 0.01 micron, preferably from about 0.1 micron, to about 20 microns, preferably to about 5 microns. In the present context, the median particle size is determined from a plot of the weight percent of particles having equivalent spherical diameters smaller than a particular equivalent spherical diameter versus equivalent spherical diameter, and is defined as the equivalent spherical diameter below which 50 weight percent of the particles have their equivalent spherical diameter.

The phyllosilicate mineral particles in the composition of this invention are at a level of from about 5 phr, preferably from about 50 phr, to about 200 phr, preferably to about 150 phr. If introduced directly in the preparation of the rubber composition of this invention, the mineral particles are introduced at the same aforesaid level and aforesaid preferred level. If introduced in the preparation of the rubber composition of this invention in the form of one of its aforesaid adducts with at least one of the organosilane of formula I or II and the quaternary ammonium salt, the adducts are introduced at a level such that the portion of each adduct contributed from the phyllosilicate mineral particles is introduced at a level of from about 5 phr, preferably from about 50 phr, to about 200 phr, preferably to about 150 phr.

In formulas I and II, preferably X is a group which upon hydrolysis forms a hydroxy group. More preferably X is selected from the group consisting of a halogen moiety and $-OR_{13}$ and wherein $R_{13}$ is an alkyl group containing from 1 to 20 carbon atoms. $-OR_{13}$ can include ether and amine linkages and thus can be 2-methoxyethoxy and 2-(methylamino)-ethoxy and similar radicals. Most preferably, X is $-OR_{13}$, and $R_{13}$ contains from 1 to 7 carbon atoms. If $R_1$, $R_2$ or Y contains an aryl group, the aryl group is preferably a phenyl group.

Preferably, the functional group on Y which is capable of reacting with a reactive site on the rubber is selected from the group consisting of a mercapto group, an allyl group, a vinyl group, an epoxy group, a methacryloxy group, an acryloxy group, and an amino group containing an active hydrogen atom. More preferably, Y contains a mercapto group, a vinyl group or an amino group having an active hydrogen atom and most preferably, Y contains from 1 to 6 carbon atoms.

Preferably, $R_1$ and $R_2$ are the same or different and are each selected from the group consisting of the group described by X. More preferably, $R_1$ and $R_2$ are the same or different and are each selected from the group consisting of a halogen radical and $-OR_{13}$ and wherein $R_{13}$ is an alkyl group containing from 1 to 20 carbon atoms and can include ether and amine linkages as described above. Most preferably, X, $R_1$ and $R_2$ are the same, and X is $-OR_{13}$, and $R_{13}$ contains from 1 to 7 carbon atoms.

Organosilanes generally described by formulas I and II are disclosed in the prior art, and are either available commercially or can be prepared by standard methods of forming organosilanes. Suitable specific organosilanes of formulas I and II include ethylvinyltrichlorosilane, vinyltriethoxysilane, vinyl-tri(2-methoxyethoxy)silane, 3-methacryloxypropyl-trimethoxysilane, 2-(3,4-epoxycyclohexyl) ethyltrimethoxysilane, 3-glycidoxypropyltrimethoxysilane, vinyltriacetoxysilane, 3-mercaptopropyltrimethoxysilane, 3-aminopropyltriethoxysilane, N-(2-aminooctyl)-3-aminopropyltrimethoxysilane, and bis[3-(triethoxysilyl)propyl]tetrasulfide. Preferred organosilanes of formula I or II are 3-aminopropyltriethoxysilane, 3-mercaptopropyltrimethoxysilane, vinyl-tri-(2-methoxyethoxy) silane and bis[3-(triethoxysilyl)propyl] tetrasulfide.

In the rubber composition of this invention, an adduct, if formed, of the rubber and phyllosilicate mineral particles with the organosilane of formula I or II is at a level such that the portion thereof contributed from the organosilane is at a level of from about 0.005 phr, preferably from about 0.25 phr, to about 15 phr, preferably to about 3 phr. If introduced directly in the preparation of the rubber composition of this invention, the organosilane of formula I or II is introduced at a level in the range of from about 0.05 phr, preferably from about 0.25 phr, to about 15 phr, preferably to about 3 phr. If the organosilane of formula I or II is introduced in the preparation of the rubber composition of this invention in the form of one of its aforesaid adducts with the phyllosilicate mineral particles, such adduct is introduced at a level such that portion of the adduct contributed from the organosilane is introduced at a level of from about 0.05 phr, preferably from about 0.25 phr, to about 15 phr, preferably to about 3 phr.

Any quaternary ammonium salt can be used in the rubber composition of this invention. Suitable quaternary ammonium salts for use in the rubber composition of this invention are disclosed in Burke, U.S. Pat. No. 3,686,113, column 5, line 11 to column 7, line 75, which is incorporated by reference herein. In addition, for the present purposes, "quaternary ammonium salts" include any cyclic salt which contains either within its ring structure or as a substituent on its ring structure at least one nitrogen atom covalently bonded to three moieties and which salt has a highly conjugated, resonance stabilized, substantially planar structure which can be depicted such that the aforesaid nitrogen atom is attached to one of the aforesaid moieties through a double bond and carries a positive charge. Readily available examples of such compounds include the following: acid fuchsin, acridine orange, acridine red, aniline blue, azure A, azure B, azure C, basic fuchsin, blue tetrazolium, brilliant green, 2-tertiary butyl-5-methylisoxazolium tetrafluoroborate, coomassie brilliant blue R, crystal violet, 3,3'-(3,3'-dimethoxy-4,4'-biphenylene)bis[2-(p-nitrophenyl)-5-phenyltetrazolium chloride], 3-(4,5-dimethyl-2-thiazolyl)-2,5-diphenyl-H-tetrazolium bromide, ethyl violet, fast green FCF, 1-(p-hydroxyphenyl)-2,4,6-triphenylpyridinium betaine, 2-(p-iodophenyl)-3-(p-nitrophenyl)-5-phenyl-2H-tetrazolium chloride, janus green B, light green SF yellowish, lissamine rhodamine B sulfonyl chloride, methylene blue, methyl green, methyl violet, nile blue A perchlorate, nitron, oxazine 1 perchlorate, pararosaniline acetate, pyronin B, pyronin Y, rhodamine B, rhodamine 6G, rodamine 110, rhodamine 6G perchlorate, safranin O, thiamine hydrochloride, toluidine blue 0, 2,3,5-triphenyl-2H-tetrazolium chloride, xylene cyanole FF, oxacarbocyanine, methylene green, cyanine, carbocyanine, styryl thiacarbocyanine, and 1,1-diethyl-2,2-quinocyanine chloride. In general, many sensitizing dyes are positively charged cyclic compounds with structures that meet the aforesaid requirements. Representative classes of such dyes which are suitable as quaternary ammonium salts include the following: cyanines, merocyanines, carbocyanines, thiacyanines and benzothiazolylrhodanines.

Preferably, the quaternary ammonium salt has a structure of formula III, IV, V, VI, or VII.

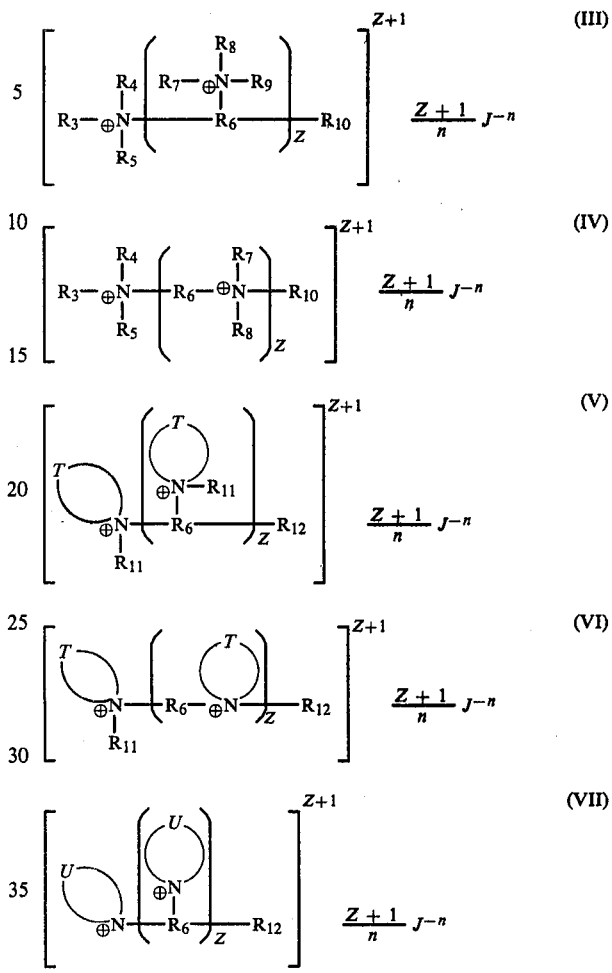

In formulas III, IV, V, VI and VII is zero or a positive integer from 1 to 100, J is an anionic radical, n is the absolute value of the oxidation state of J, and $R_6$ is an alkylenyl radical containing from 2 to 20 carbon atoms or an aryl radical containing from 6 to 14 carbon atoms.

In formulas III and IV, $R_3$, $R_4$, $R_5$, $R_7$, $R_8$ and $R_9$ are the same or different and are each selected from the group consisting of: aliphatic radicals containing a total of from 1 to 3 carbon atoms which are saturated or unsaturated and unsubstituted or substituted with at least one hydroxy or alkoxy group; straight- or branched-chain aliphatic radicals containing a total of from 8 to 40 carbon atoms which are saturated or unsaturated and unsubstituted or substituted with at least one hydroxy, alkoxy or polyalkoxy group; and aryl radicals containing from 6 to 18 carbon atoms; and saturated or unsaturated araliphatic radicals containing a total of from 7 to 48 carbon atoms.

In formulas III and IV, when Z is zero, $R_{10}$ is selected from the group consisting of the groups described by $R_3$, $R_4$, $R_5$, $R_7$, $R_8$ and $R_9$, and when Z is a positive integer, $R_{10}$ is selected from the group consisting of the groups described by $R_3$, $R_4$, $R_5$, $R_7$, $R_8$ and $R_9$ and a hydrogen atom.

In formulas III and IV, (1) at least one of $R_3$, $R_4$, $R_5$, $R_7$, $R_8$, $R_9$, and $R_{10}$ is an aliphatic radical containing a total of from 1 to 3 carbon atoms and (2) either (a) at least one of $R_3$, $R_4$, $R_5$, $R_7$, $R_8$, $R_9$ and $R_{10}$ is an aliphatic radical containing at least 12 carbon atoms, or (b) at least two of $R_3$, $R_4$, $R_5$, $R_7$, $R_8$, $R_9$ and $R_{10}$ are aliphatic radicals containing at least 8 carbon atoms.

In formulas V and VI, $R_{11}$ is selected from the group consisting of the groups described by $R_3$, $R_4$, $R_5$, $R_7$, $R_8$ and $R_9$ and alkylamidoalkyl or alkylesteralkyl groups containing a total of at least 14 carbon atoms. In formulas V, VI and VII, when Z is zero, $R_{12}$ is selected from the group consisting of the groups described by $R_{11}$, and when Z is a positive integer, $R_{12}$ is selected from the group consisting of the groups described by $R_{11}$ and a hydrogen atom.

In formulas V, VI and VII, each of T and U is a radical which, in conjunction with each nitrogen atom to which it is shown attached in formula V, VI or VII, forms a heterocyclic radical containing at least one nitrogen atom in the ring system and containing only nitrogen and carbon atoms in the ring system, and the T and U portions of the ring system are unsubstituted or substituted by at least one alkyl group with the total number of ring substituents on T and U being from 8 to 22 carbon atoms.

In formulas III, IV, V, VI and VII, Z preferably is zero or a positive integer from 1 to 5 and more preferably is zero or 1. J is suitably an organic radical such as methyl sulfate or acetate or an inorganic radical such as halide, nitrite, nitrate, sulfate or phosphate. J preferably is an inorganic radical and more preferably is a halide radical.

If $R_3$, $R_4$, $R_5$, $R_7$, $R_8$, $R_9$, $R_{10}$, $R_{11}$, or $R_{12}$ is an aliphatic radical containing from 1 to 3 carbon atoms, preferably the radical is a methyl radical. If $R_3$, $R_4$, $R_5$, $R_7$, $R_8$, $R_9$, $R_{10}$, $R_{11}$, or $R_{12}$ is an aliphatic radical containing at least 8 carbon atoms, such radical preferably contains from 12 to 22 carbon atoms. Furthermore, if $R_3$, $R_4$, $R_5$, $R_7$, $R_8$, $R_9$, $R_{10}$, $R_{11}$ or $R_{12}$ is an aliphatic radical containing at least 8 carbon atoms and a polyalkoxy radical, preferably the polyalkoxy radical contains from 2 to 15 repeating ethoxy radical units.

If $R_3$, $R_4$, $R_5$, $R_7$, $R_8$, $R_9$, $R_{10}$, $R_{11}$, or $R_{12}$ is an araliphatic radical, such radical preferably contains from 7 to 22 carbon atoms.

Preferably, at least one of $R_3$, $R_4$, $R_5$, $R_7$, $R_8$, $R_9$, $R_{10}$, $R_{11}$ and $R_{12}$ is a methyl radical. At least one of $R_3$, $R_4$, $R_5$, $R_7$, $R_8$, $R_9$, $R_{10}$, $R_{11}$ and $R_{12}$ is preferably an aliphatic radical containing at least 12 carbon atoms, more preferably an aliphatic radical containing from 12 to 22 carbon atoms and most preferably a straight-chain aliphatic radical containing from 12 to 22 carbon atoms.

$R_6$ is preferably an alkylenyl radical containing from 2 to 6 carbon atoms and more preferably an alkylenyl radical containing 2 or 3 carbon atoms.

The sole difference between T in formulas V and VI and U in formula VII is that T is attached through two single bonds to the nitrogen atom shown in formulas V and VI, and U is attached through one single and one double bond to the nitrogen atom shown in formula VII. The heterocyclic rings in formulas V, VI and VII are unsubstituted or substituted by at least one alkyl group.

Typical quaternary ammonium radicals formed by T or U in conjunction with the nitrogen atom to which it is shown attached in formula V, VI or VII include the following: pyrrolidinium, pyrrolium, pyrrolinium, imidazolium, pyrazolium, triazolium, pyridinium, pyrimidinium, pyridazinium, pyrazinium, triazinium, indolium, indazolium, benzimidazolium, quinolinium, isoquinolinium, cinnolinium, phthalazinium, quinazolinium, quinoxalinium, naphthyridinium, quinolizinium, carbazolium, acridinium, phenazinium, phenanthridinium, phenanthrolinium, benzo[H]isoquinolinium, purinium, porphinium, and pteridinium and the quaternary ammonium salts formed by partial or complete hydrogenation of the heterocyclic rings of any of the aforesaid quaternary ammonium salts.

Preferably, the quaternary ammonium salt radical formed by T or U in conjunction with the nitrogen atom to which it is shown attached in formula V, VI or VII is an imidazolinium salt or a pyridinium salt.

In the rubber composition of this invention, an adduct, if formed, of the rubber and phyllosilicate mineral particles with the quaternary ammonium salt is at a level such that the portion thereof contributed from the quaternary ammonium salt is at a level of from about 0.005 phr, preferably from about 0.02 phr, to about 15 phr, preferably to about 3 phr. If introduced directly in the preparation of the rubber composition of this invention, the quaternary ammonium salt is introduced at a level in the range of from about 0.005 phr, preferably from about 0.25 phr, to about 15 phr, preferably to about 3 phr. If the quaternary ammonium salt is introduced in the preparation of the rubber composition of this invention in the form of one of its aforesaid adducts with the phyllosilicate mineral particles, such adduct is introduced at a level such that the portion of the adduct contributed from the quaternary ammonium salt is introduced at a level of from about 0.005 phr, preferably from about 0.02 phr, to about 15 phr, preferably to about 3 phr.

Preparation of the rubber composition of this invention is conventional except for the addition of the organosilane of formula I or II and quaternary ammonium salt. Any conventional compounding method which can accommodate the introduction of the organosilane and quaternary ammonium salt can be employed. Whether the phyllosilicate mineral particles, organosilane and quaternary ammonium salt are introduced in the compounding process simultaneously or at different stages or whether as separate components or in the form of their various adducts as described hereinabove is generally a matter of convenience. In certain instances, for example, when either the organosilane or quaternary ammonium salt is difficult to disperse uniformly in the rubber, it is preferred to first form an adduct of it with the phyllosilicate mineral particles and then to disperse the adduct in the rubber.

In one suitable method of preparation, a batch of natural or synthetic rubber is initially mixed in a conventional internal mixer such as a Banbury mixer. As mixing proceeds, the temperature of the rubber increases. When the temperature reaches a temperature in the range of from about 40° C. to about 60° C., a metallic oxide, typically zinc oxide, at a level of from about 1 to about 10 phr, a fatty acid, typically stearic acid, at a level of from about 0.5 to about 5 phr, and an antioxidant, typically butylated p-phenylphenol, at a level of from about 0.5 to about 7 phr are introduced into the rubber during mixing. In the alternative, the oxide, fatty acid and antioxidant can be introduced initially with the rubber.

Mixing is then continued until the temperature of the mixing increases to a temperature in the range of from about 70° C. to about 80° C., at which point a softening agent, such as process oil, and the particulate filler, organosilane and quaternary ammonium salt are added.

Mixing is continued until the temperature of the mixture reaches about 80° C. to about 90° C. At this point the curing agent(s) is (are) added at a level of from about 1 to about 10 phr, and mixing is continued until the temperature reaches about 110° C. or for about a minute, whichever is shorter. Typical curing agents include sulfur and sulfur-donating materials (in combination with suitable accelerators commonly known in the art) and peroxides and other free radical producing systems.

The resulting mixture is then removed from the mixer and formed into a predetermined shape, for example, sheets. After storing overnight, the shaped mixture is cured by pressure molding at 160° C. for about a period of time corresponding to $T_c(90)$, as defined hereinafter.

In the alternative, a particulate adduct of the phyllosilicate mineral particles and the organosilane of formula I or II and/or quaternary ammonium salt may be formed in a separate pretreatment step, and the adduct, instead of the separate components from which the adduct is made, is introduced into the rubber in the above procedure. For example, one particulate adduct of the phyllosilicate mineral particles and the organosilane of formula I or II and/or the quaternary ammonium salt is prepared by agitating the phyllosilicate mineral particles in a Littleford Brothers Model KM 130 Mixer. Heat is generated in the agitation process. Then the other component(s) of the adduct to be made is (are) sprayed through a nozzle into the agitated phyllosilicate mineral particles, and the resulting mixture is stirred for about 15 minutes and is thereafter removed from the mixer and dried at 100° C.

The following examples describe in detail compositions and methods illustrative of the present invention. It will be apparent to those skilled in the art that many modifications, both of materials and methods, may be practiced without departing from the purpose and intent of this disclosure.

EXAMPLES 1–67

In each of Examples 1–45, the following procedure was employed, except where otherwise indicated. A bath of 100 parts by weight of rubber was introduced into a water-cooled 2-roll external mill in which the rolls were set to a thickness of 1/16 inch and one roll was operated at 14 rpm and the second roll at 18 rpm and the rubber was mixed until a band formed. At this point, 5 phr of zinc oxide, 1 phr of stearic acid and 1 phr of 2,2-methylene-bis-(4-methyl-6-t-butylphenol) of American Cyanamid as the antioxidant were introduced into the mill, and mixing was continued until the zinc oxide, stearic acid and antioxidant were fully incorporated into the rubber and the mixture appeared homogeneous. Next, the band was cut to form a sheet of the rubber mixture, which was then removed from the mill, folded over on itself, and turned and reinserted into the mill so that the reinserted sheet traveled through the mill along a line in the reinserted sheet which was approximately perpendicular to the line in the sheet along which the sheet last traveled through the mill. The process of cutting, removing, folding, turning and reinserting was repeated nine times. The reinserted sheet was then allowed to again form a band in the mill, at which point 10 phr of light process oil (Witco's Cyclolube NN-2), varying amounts of a quaternary ammonium salt and of an adduct of 75 phr by weight of (a) talc (such as Cyprus Industrial Minerals Mistron Vapor ®) having a median particle size of about 1.8 microns and a specific surface area of about 16 square meters per gram and (b) varying amounts of a silane of formula I or II. The process of milling, cutting the band, removing the resulting sheet from the mill and folding, turning and reinserting the sheet as described above was performed ten times. The band was then cut and the rubber sheet was removed from the mill and allowed to cool for up to an hour. The sheet was then reinserted in the mill and rebanded and 3 phr of sulfur and 0.75 phr of a mercaptobenzothiazole disulfide accelerator (R. T. Vanderbilt's Altax) were added. The process of milling, cutting the band, removing the resulting sheet from the mill and folding, turning and reinserting the sheet as described above was performed ten times.

At this point the rubber mixture was cut and removed from the 2-roll mill, and the resulting sheets were cooled and stored at room temperature overnight. Prior to vulcanization, the sheets were remilled in the 2-roll mill. The remilled sheets were vulcanized at 160° C. using a compression molding technique. The vulcanized products were then tested by standard methods to determine their rheometric, static, dynamic, tear, hardness, rebound, compression and flex fatigue properties, as described hereinbelow.

In each of Examples 46–67, the following procedure was employed, except where otherwise indicated. A batch of 100 parts by weight of rubber, 5 parts by weight of zinc oxide, 1 part by weight of stearic acid and 1 part by weight of 2,2-methylene-bis-(4-methyl-6-t-butylphenol) of American Cyanamid was introduced into a water-cooled BR Banbury internal mixer having two rolls and an air activated ram. The rotor speed of the mixer was set at 125 rpm and the water and air pressure to the mixer were set at 20 and 15 pounds per square inch, respectively. The mixer was allowed to run for about 30 seconds, until temperature of the mixture reached 66° C., at which point mixing was stopped, and 10 parts by weight of light process oil (Witco's Cyclolube NN-2), and varying amounts of a quaternary ammonium salt and of an adduct of 75 phr by weight of (a) talc (such as Cyprus Industrial Minerals Mistron Vapor ®) having a median particle size of about 1.8 microns and a specific surface area of about 16 square meters per gram and (b) varying amounts of a silane of formula I or II were added to the mixture. Mixing was continued until the temperature of the mixture reached 82° C., whereupon mixing was stopped temporarily while any loose powder was removed from the ram. Mixing was again continued until the temperature reached 93° C., at which point mixing was stopped to permit loose powder to again be removed from the ram, and 3 parts by weight of sulfur and 0.75 part by weight of a mercapto-benzothiazole disulfide accelerator (R. T. Vanderbilt's Altax) were added. Further mixing to a temperature of 104° C. was followed by stopping mixing and removing loose powder from the ram. Mixing was resumed until the temperature of the mixture reached 116° C. At this point the mixture was removed from the Banbury mixer.

The mixture was then formed into sheets in a 2-roll mill set to a thickness of 3/16-inch. The resulting sheets were cooled and stored at room temperature overnight. Prior to vulcanization, the sheets were remilled in the 2-roll mill. The remilled sheets were vulcanized at 160° C. using a compression molding technique. The vulcanized sheets were then tested by standard methods to determine their rheometric, static, dynamic, tear, hardness, rebound, compression and flex fatigue properties, as described hereinbelow.

In each of Examples 1-67 which involves an organosilane, the adduct of the silane and talc employed was formed by introducing the silane into the talc and blending the resulting mixture in a dry blend mixer to a uniform consistency. The resulting adduct was then dried overnight at about 100° C.

In each of Examples 1-67, a styrene-butadiene-type 1502 synthetic rubber was employed. 3-methacryloxypropyltrimethoxysilane, bis[3-(triethoxysilyl)propyl]-tetrasulfide, and 3-aminopropyltriethoxysilane were employed as the organosilane in Examples 1-15, 16-30, and 31-67, respectively. 1-methyl-1-oleylamido ethyl-2-oleyl imidazolinium methyl sulfate, tallow trimethyl ammonium chloride, and ditallow dimethyl ammonium chloride were employed as the quaternary ammonium salts in Examples 1-15, 16-30, and 31-60, respectively. Ditallow dimethyl ammonium chloride was also employed in Example 66. Methylene blue was employed as the quaternary ammonium salt in Examples 61-63 and 67. Toluidine blue and safranine O were employed as the quaternary ammonium salts in Examples 64 and 65, respectively. The amounts of the organosilanes and quaternary ammonium salts employed in Examples 1-67 are indicated in Table I, in units of parts per hundred parts by weight of rubber (phr).

The rheometric data were obtained using ASTM test D-2084-75 with a 1° amplitude of oscillation of the test disk about its center position and at 320° F. and are presented in Table II. $M_L$ and $M_H$ represent the minimum torque and maximum torque, respectively. $T_{S2}$ represents the time to 2 units of torque increase above the minimum and is accepted as the scorch time. $T_c(10)$ and $T_c(90)$ represent the times to 10 and 90 percent, respectively, of full torque development, and $T_c(90)$ is accepted as the cure time.

The static properties were measured in accordance with ASTM test D-412-75-Method A, and the test results are presented in Table III. $E_u$ and $T_u$ represent the ultimate elongation and ultimate tensile strength, respectively. $T_{100}$, $T_{200}$, $T_{300}$ and $T_{400}$ represent the tensile strength at 100, 200, 300 and 400 percent elongation, respectively.

The dynamic properties were measured using a Dynastat Viscoelastic Analyzer marketed by Imass, Inc. of Accord, Mass. The test samples were each in the shape of a cylindrical button of 0.5-inch diameter and 0.375-inch height. The results are presented in Table IV. The reported results were obtained at a frequency of 10 Hertz and at room temperature. M' represents the storage or elastic modulus, and M'' represents the viscous or loss modulus. M' and M'' are denoted and measured as E' and E'' on the Dynastat Analyzer. Tan Delta is the quotient obtained by dividing M'' by M'. Tan Delta is a property which is indicative of heat buildup with cyclical flexing and is an important characteristic in compositions for use as tire sidewall and tread stock. These dynamic properties can also be measured by other techniques known in the art.

The tear resistance properties were measured by ASTM test D-624-73-Die C Method and are reported in Table V. Also reported in Table V are values for the Shore A Hardness, Rebound D, compression set and fatigue. Shore A Hardness was measured using ASTM test D-2240-75. Rebound D was measured using ASTM test D-2632. Compression set was measured using ASTM test D-395-69-Method B heating at 100° C. for 70 hours. Fatigue was measured using the Monsanto Fatigue To Failure Tester and method.

The results presented in Tables II-V indicate that, for some combinations of an organosilane of formula I or II with a quaternary ammonium salt in the composition of this invention, an unexpected improvement in certain properties is observed, relative to their values for a rubber composition containing the organosilane alone and at a concentration level which is essentially equivalent to the combined concentrations of the organosilane and quaternary ammonium salt in such combinations. For some other combinations of an organosilane of formula I or II with a quaternary ammonium salt in the composition of this invention, the values of such properties are substantially the same and thus not adversely affected, relative to their values for a rubber composition containing the organosilane alone and at a concentration level which is essentially equivalent to the combined concentrations of the organosilane and quaternary ammonium salt in such combinations.

TABLE I

| Example | Concentration (phr) | |
|---|---|---|
| No. | Silane | Salt |
| 1 | 0 | 0 |
| 2 | 0.38 | 0 |
| 3 | 0.75 | 0 |
| 4 | 1.13 | 0 |
| 5 | 1.5 | 0 |
| 6 | 1.13 | 0.75 |
| 7 | 0.75 | 0.75 |
| 8 | 0.38 | 0.75 |
| 9 | 0 | 0.75 |
| 10 | 0 | 1.5 |
| 11 | 0.38 | 1.5 |
| 12 | 0.75 | 1.5 |
| 13 | 0.38 | 2.25 |
| 14 | 0 | 2.25 |
| 15 | 0 | 3 |
| 16 | 0 | 0 |
| 17 | 0.38 | 0 |
| 18 | 0.75 | 0 |
| 19 | 1.13 | 0 |
| 20 | 1.5 | 0 |
| 21 | 1.13 | 0.75 |
| 22 | 0.75 | 0.75 |
| 23 | 0.38 | 0.75 |
| 24 | 0 | 0.75 |
| 25 | 0 | 1.5 |
| 26 | 0.38 | 1.5 |
| 27 | 0.75 | 1.5 |
| 28 | 0.38 | 2.25 |
| 29 | 0 | 2.25 |
| 30 | 0 | 3 |
| 31 | 0 | 0 |
| 32 | 0.38 | 0 |
| 33 | 0.75 | 0 |
| 34 | 1.13 | 0 |
| 35 | 1.5 | 0 |
| 36 | 1.13 | 0.75 |
| 37 | 0.75 | 0.75 |
| 38 | 0.38 | 0.75 |
| 39 | 0 | 0.75 |
| 40 | 0 | 1.5 |
| 41 | 0.38 | 1.5 |
| 42 | 0.75 | 1.5 |
| 43 | 0.38 | 2.25 |
| 44 | 0 | 2.25 |
| 45 | 0 | 3 |
| 46 | 0 | 0 |
| 47 | 0.38 | 0 |
| 48 | 0.75 | 0 |
| 49 | 1.13 | 0 |
| 50 | 1.5 | 0 |
| 51 | 1.13 | 0.75 |
| 52 | 0.75 | 0.75 |
| 53 | 0.38 | 0.75 |
| 54 | 0 | 0.75 |
| 55 | 0 | 1.5 |
| 56 | 0.38 | 1.5 |
| 57 | 0.75 | 1.5 |

TABLE I-continued

| Example No. | Concentration (phr) | |
|---|---|---|
| | Silane | Salt |
| 58 | 0.38 | 2.25 |
| 59 | 0 | 2.25 |
| 60 | 0 | 3 |
| 61 | 0.75 | 0.38 |
| 62 | 0.75 | 1.13 |
| 63 | 0.75 | 0.38 |
| 64 | 0.75 | 0.38 |
| 65 | 0.75 | 0.38 |
| 66 | 0.75 | 0.75 |
| 67 | 0.75 | 0.38 |

TABLE II

| Example No. | Rheometric Properties | | | | |
|---|---|---|---|---|---|
| | $M_L$ (inch-lbs.) | $M_H$ (inch-lbs.) | $T_{S2}$ (min.) | $T_c(10)$ (min.) | $T_c(90)$ (min.) |
| 1 | 7.0 | 17.0 | 11.2 | 9.8 | 26.0 |
| 2 | 5.0 | 15.0 | 11.4 | 9.8 | 25.4 |
| 3 | 5.0 | 14.0 | 11.6 | 10.0 | 26.0 |
| 4 | 5.0 | 14.0 | 11.6 | 10.0 | 26.0 |
| 5 | 4.5 | 13.0 | 13.0 | 11.2 | 26.0 |
| 6 | 4.5 | 31.5 | 3.8 | 3.9 | 13.4 |
| 7 | 4.0 | 26.5 | 6.6 | 6.7 | 20.2 |
| 8 | 4.5 | 27.0 | 6.6 | 6.3 | 19.6 |
| 9 | 5.0 | 27.0 | 6.4 | 6.4 | 18.8 |
| 10 | 4.0 | 27.5 | 4.0 | 4.4 | 12.6 |
| 11 | 4.5 | 27.0 | 4.2 | 4.3 | 13.2 |
| 12 | 4.0 | 27.0 | 4.1 | 4.2 | 13.6 |
| 13 | 3.5 | 24.5 | 3.3 | 3.5 | 11.0 |
| 14 | 4.0 | 25.5 | 3.5 | 3.6 | 12.4 |
| 15 | 4.0 | 24.5 | 3.0 | 3.0 | 11.2 |
| 16 | 6.5 | 14.0 | 12.0 | 10.0 | 21.0 |
| 17 | 6.0 | 20.5 | 10.6 | 10.2 | 27.8 |
| 18 | 5.0 | 22.0 | 9.7 | 9.4 | 27.2 |
| 19 | 6.5 | 25.0 | 9.0 | 8.8 | 28.2 |
| 20 | 7.0 | 22.0 | 9.2 | 8.6 | 24.0 |
| 21 | 6.5 | 39.0 | 3.4 | 3.6 | 10.0 |
| 22 | 4.5 | 36.5 | 3.2 | 3.4 | 10.0 |
| 23 | 6.5 | 38.5 | 3.2 | 3.4 | 10.2 |
| 24 | 6.0 | 32.0 | 3.6 | 3.8 | 11.4 |
| 25 | 6.0 | 30.0 | 2.2 | 2.2 | 11.6 |
| 26 | 6.0 | 37.0 | 2.4 | 2.6 | 11.6 |
| 27 | 6.5 | 39.0 | 2.2 | 2.4 | 12.2 |
| 28 | 5.0 | 33.5 | 2.0 | 2.1 | 13.6 |
| 29 | 6.5 | 27.5 | 1.9 | 2.0 | 12.8 |
| 30 | 7.0 | 27.0 | 1.7 | 1.7 | 15.0 |
| 31 | 8.0 | 19.0 | 11.2 | 10.0 | 28.6 |
| 32 | 5.0 | 23.5 | 7.5 | 7.4 | 26.7 |
| 33 | 8.0 | 30.0 | 6.1 | 6.3 | 24.4 |
| 34 | 5.5 | 27.5 | 3.9 | 4.0 | 16.5 |
| 35 | 5.5 | 31.0 | 3.1 | 3.2 | 16.6 |
| 36 | 8.0 | 36.5 | 1.7 | 1.7 | 7.7 |
| 37 | 9.0 | 36.5 | 2.1 | 2.1 | 7.7 |
| 38 | 6.5 | 34.0 | 2.5 | 2.6 | 8.0 |
| 39 | 6.0 | 30.0 | 3.6 | 3.7 | 8.8 |
| 40 | 8.0 | 30.5 | 2.4 | 2.4 | 7.0 |
| 41 | 7.0 | 34.0 | 2.2 | 2.3 | 7.4 |
| 42 | 6.0 | 34.0 | 1.8 | 1.9 | 7.0 |
| 43 | 7.5 | 33.0 | 1.6 | 1.7 | 8.2 |
| 44 | 7.0 | 27.5 | 2.2 | 2.2 | 6.6 |
| 45 | 6.0 | 23.5 | 1.9 | 1.9 | 8.0 |
| 46 | 6.5 | 16.0 | 13.2 | 12.2 | 31.2 |
| 47 | 4.5 | 21.0 | 10.8 | 10.2 | 30.0 |
| 48 | 5.0 | 27.5 | 7.4 | 7.2 | 28.0 |
| 49 | 6.0 | 30.5 | 6.8 | 6.8 | 24.0 |
| 50 | 8.0 | 35.5 | 2.8 | 2.9 | 10.0 |
| 51 | 7.0 | 32.0 | 3.2 | 3.4 | 10.6 |
| 52 | 7.5 | 34.5 | 2.2 | 2.3 | 9.0 |
| 53 | 7.5 | 32.0 | 5.8 | 6.0 | 20.4 |
| 54 | 4.5 | 30.0 | 4.2 | 4.5 | 12.0 |
| 55 | 4.0 | 29.0 | 2.7 | 2.7 | 8.6 |
| 56 | 5.0 | 38.0 | 2.2 | 2.2 | 8.4 |
| 57 | 10.0 | 35.5 | 1.9 | 2.0 | 8.6 |
| 58 | 6.5 | 32.0 | 1.8 | 1.8 | 9.0 |
| 59 | 6.0 | 29.5 | 1.8 | 1.8 | 7.2 |
| 60 | 5.5 | 27.0 | 1.6 | 1.7 | 8.2 |
| 61 | 5.9 | 35.0 | 2.6 | 3.1 | 15.2 |
| 62 | 10.5 | 40.5 | 3.1 | 3.3 | 15.2 |
| 63 | 6.5 | 37.5 | 5.0 | 5.2 | 19.6 |
| 64 | 9.5 | 39.0 | 3.4 | 3.6 | 15.8 |
| 65 | 9.0 | 35.0 | 2.7 | 2.7 | 14.2 |
| 66 | 10.0 | 37.0 | 2.0 | 2.1 | 13.8 |
| 67 | 5.8 | 35.5 | 1.6 | 1.9 | 10.0 |

TABLE III

| Example No. | Static Properties | | | | | |
|---|---|---|---|---|---|---|
| | $E_u$ (%) | $T_u$ (psi) | $T_{400}$ (psi) | $T_{300}$ (psi) | $T_{200}$ (psi) | $T_{100}$ (psi) |
| 1 | * | * | 333 | 303 | 271 | 225 |
| 2 | 950 | 984 | 330 | 300 | 263 | 210 |
| 3 | 950 | 1000 | 352 | 324 | 283 | 224 |
| 4 | * | * | 340 | 309 | 272 | 212 |
| 5 | * | * | 328 | 301 | 258 | 209 |
| 6 | 625 | 2200 | 725 | 557 | 458 | 369 |
| 7 | 747 | 2272 | 592 | 496 | 428 | 342 |
| 8 | 738 | 2216 | 602 | 504 | 429 | 344 |
| 9 | 753 | 2063 | 530 | 442 | 376 | 310 |
| 10 | 724 | 2532 | 532 | 419 | 346 | 289 |
| 11 | 724 | 2391 | 547 | 435 | 365 | 302 |
| 12 | 698 | 2198 | 544 | 436 | 364 | 301 |
| 13 | 709 | 2285 | 460 | 355 | 295 | 253 |
| 14 | 691 | 2379 | 519 | 406 | 340 | 290 |
| 15 | 700 | 2253 | 441 | 338 | 273 | 241 |
| 16 | * | * | 331 | 299 | 266 | 217 |
| 17 | 866 | 1404 | 664 | 612 | 529 | 356 |
| 18 | 906 | 1925 | 849 | 797 | 681 | 414 |
| 19 | 838 | 1825 | 935 | 876 | 762 | 469 |
| 20 | 883 | 1746 | 868 | 822 | 702 | 425 |
| 21 | 585 | 2149 | 1090 | 864 | 725 | 541 |
| 22 | 622 | 2434 | 1001 | 790 | 665 | 495 |
| 23 | 591 | 1980 | 897 | 705 | 590 | 446 |
| 24 | 635 | 2188 | 692 | 526 | 420 | 328 |
| 25 | 613 | 1945 | 585 | 434 | 350 | 292 |
| 26 | 571 | 1876 | 805 | 618 | 519 | 427 |
| 27 | 548 | 1855 | 941 | 715 | 601 | 489 |
| 28 | 561 | 1621 | 723 | 556 | 470 | 404 |
| 29 | 533 | 1239 | 607 | 437 | 346 | 290 |
| 30 | 626 | 1911 | 512 | 373 | 297 | 252 |
| 31 | 884 | 1389 | 408 | 368 | 326 | 264 |
| 32 | 808 | 1954 | 805 | 742 | 643 | 436 |
| 33 | 768 | 2111 | 991 | 890 | 773 | 492 |
| 34 | 672 | 1855 | 1136 | 993 | 860 | 534 |
| 35 | 674 | 1833 | 1079 | 944 | 823 | 531 |
| 36 | 464 | 1578 | 1281 | 1017 | 843 | 604 |
| 37 | 487 | 1581 | 1181 | 936 | 789 | 552 |
| 38 | 565 | 1856 | 963 | 750 | 624 | 451 |
| 39 | 631 | 2017 | 639 | 476 | 386 | 307 |
| 40 | 631 | 1898 | 520 | 384 | 312 | 262 |
| 41 | 553 | 1712 | 851 | 656 | 542 | 423 |
| 42 | 512 | 1638 | 1056 | 822 | 694 | 517 |
| 43 | 579 | 1606 | 669 | 526 | 439 | 373 |
| 44 | 596 | 1610 | 522 | 382 | 308 | 267 |
| 45 | 622 | 1588 | 450 | 333 | 263 | 224 |
| 46 | * | * | 377 | 335 | 290 | 223 |
| 47 | 873 | 1896 | 745 | 677 | 572 | 364 |
| 48 | 805 | 2327 | 999 | 907 | 775 | 476 |
| 49 | 761 | 1989 | 978 | 882 | 746 | 453 |
| 50 | 641 | 2034 | 1291 | 1094 | 936 | 545 |
| 51 | 628 | 2542 | 1144 | 907 | 524 | 254 |
| 52 | 639 | 2664 | 1161 | 918 | 760 | 509 |
| 53 | 643 | 2568 | 999 | 807 | 680 | 493 |
| 54 | 726 | 2587 | 684 | 537 | 430 | 324 |
| 55 | 667 | 2644 | 747 | 549 | 422 | 322 |
| 56 | 586 | 2227 | 1031 | 779 | 625 | 461 |
| 57 | 569 | 2113 | 1037 | 788 | 649 | 483 |
| 58 | 597 | 2151 | 880 | 668 | 544 | 415 |
| 59 | 603 | 2046 | 731 | 517 | 385 | 286 |
| 60 | 629 | 1866 | 584 | 419 | 315 | 244 |
| 61 | 561 | 2487 | 1582 | 1336 | 1144 | 777 |
| 62 | 553 | 1985 | 1440 | 1221 | 1005 | 623 |
| 63 | 573 | 1616 | 1102 | 940 | 799 | 513 |
| 64 | 616 | 1708 | 1056 | 891 | 742 | 437 |

TABLE III-continued

| Example No. | Static Properties ||||||
|---|---|---|---|---|---|---|
| | $E_u$ (%) | $T_u$ (psi) | $T_{400}$ (psi) | $T_{300}$ (psi) | $T_{200}$ (psi) | $T_{100}$ (psi) |
| 65 | 590 | 1795 | 1182 | 982 | 828 | 488 |
| 66 | 581 | 2071 | 1224 | 973 | 803 | 483 |
| 67 | 491 | 2531 | 1901 | 1504 | 1193 | 817 |

*Sample did not break at 950% elongation.

TABLE IV

| Example No. | Dynamic Properties |||
|---|---|---|---|
| | M' (psi) | M" (psi) | Tan Delta |
| 1 | 1363 | 288 | 0.211 |
| 2 | 1376 | 301 | 0.219 |
| 3 | 1336 | 291 | 0.218 |
| 4 | 1382 | 302 | 0.218 |
| 5 | 1343 | 297 | 0.221 |
| 6 | 1488 | 239 | 0.161 |
| 7 | 1515 | 265 | 0.175 |
| 8 | 1533 | 271 | 0.177 |
| 9 | 1492 | 251 | 0.168 |
| 10 | 1418 | 252 | 0.178 |
| 11 | 1449 | 260 | 0.180 |
| 12 | 1410 | 249 | 0.177 |
| 13 | 1348 | 246 | 0.182 |
| 14 | 1347 | 258 | 0.191 |
| 15 | 1340 | 265 | 0.235 |
| 16 | 1301 | 306 | 0.235 |
| 17 | 1375 | 292 | 0.212 |
| 18 | 1410 | 289 | 0.205 |
| 19 | 1370 | 266 | 0.194 |
| 20 | 1417 | 296 | 0.209 |
| 21 | 1646 | 264 | 0.160 |
| 22 | 1685 | 276 | 0.164 |
| 23 | 1637 | 268 | 0.164 |
| 24 | 1637 | 265 | 0.162 |
| 25 | 1749 | 333 | 0.191 |
| 26 | 1733 | 310 | 0.179 |
| 27 | 1741 | 307 | 0.176 |
| 28 | 1818 | 368 | 0.202 |
| 29 | 1791 | 365 | 0.204 |
| 30 | 1769 | 404 | 0.228 |
| 31 | 1355 | 294 | 0.217 |
| 32 | 1447 | 260 | 0.180 |
| 33 | 1464 | 247 | 0.169 |
| 34 | 1487 | 243 | 0.163 |
| 35 | 1521 | 239 | 0.157 |
| 36 | 1429 | 189 | 0.133 |
| 37 | 1417 | 189 | 0.133 |
| 38 | 1368 | 193 | 0.141 |
| 39 | 1384 | 215 | 0.156 |
| 40 | 1343 | 195 | 0.145 |
| 41 | 1333 | 191 | 0.143 |
| 42 | 1334 | 187 | 0.140 |
| 43 | 1347 | 232 | 0.172 |
| 44 | 1396 | 208 | 0.149 |
| 45 | 1445 | 298 | 0.206 |
| 46 | 1471 | 290 | 0.197 |
| 47 | 1504 | 264 | 0.175 |
| 48 | 1512 | 242 | 0.160 |
| 49 | 1598 | 257 | 0.160 |
| 50 | 1641 | 321 | 0.196 |
| 51 | 1543 | 240 | 0.155 |
| 52 | 1618 | 245 | 0.151 |
| 53 | 1556 | 243 | 0.156 |
| 54 | 1556 | 266 | 0.170 |
| 55 | 1626 | 252 | 0.155 |
| 56 | 1842 | 304 | 0.165 |
| 57 | 1443 | 211 | 0.146 |
| 58 | 1588 | 260 | 0.164 |
| 59 | 1648 | 264 | 0.160 |
| 60 | 1686 | 296 | 0.176 |
| 61 | 1685 | 245 | 0.150 |
| 62 | 1506 | 205 | 0.136 |
| 63 | 1405 | 180 | 0.128 |
| 64 | 1249 | 148 | 0.119 |
| 65 | 1418 | 179 | 0.126 |
| 66 | 1288 | 159 | 0.126 |
| 67 | 1655 | 298 | 0.180 |

TABLE V

| Example No. | Tear Resistance Die C (ppi) | Shore A Hardness | Rebound D (%) | Comp. Set (%) | Flex Fatigue (Cycles ÷ 100) |
|---|---|---|---|---|---|
| 1 | 146 | 58 | 40 | 77 | 1126 |
| 2 | 150 | 56 | 41 | 65 | 1346 |
| 3 | 158 | 55 | 41 | 64 | 1256 |
| 4 | 159 | 57 | 40 | 65 | 1422 |
| 5 | 158 | 56 | 41 | 62 | 1409 |
| 6 | 169 | 60 | 43 | 62 | 125 |
| 7 | 169 | 60 | 41 | 57 | — |
| 8 | 169 | 58 | 42 | 57 | — |
| 9 | 159 | 57 | 42 | 69 | — |
| 10 | 142 | 56 | 43 | 77 | — |
| 11 | 145 | 59 | 42 | 69 | — |
| 12 | 165 | 55 | 42 | 65 | — |
| 13 | 130 | 56 | 42 | 83 | — |
| 14 | 145 | 56 | 41 | 66 | — |
| 15 | 128 | 55 | 40 | 85 | — |
| 16 | 143 | 57 | 46 | — | — |
| 17 | 213 | 60 | 45 | — | — |
| 18 | 241 | 61 | 46 | — | — |
| 19 | 261 | 62 | 46 | — | — |
| 20 | 236 | 62 | 46 | — | — |
| 21 | 208 | 65 | 46 | — | — |
| 22 | 186 | 65 | 47 | — | — |
| 23 | 176 | 64 | 47 | — | — |
| 24 | 153 | 63 | 48 | — | — |
| 25 | 113 | 64 | 46 | — | — |
| 26 | 168 | 65 | 48 | — | — |
| 27 | 171 | 64 | 47 | — | — |
| 28 | 170 | 64 | 45 | — | — |
| 29 | 136 | 62 | 45 | — | — |
| 30 | 117 | 63 | 42 | — | — |
| 31 | 165 | 60 | 41 | 66 | 838 |
| 32 | 200 | 60 | 42 | 55 | 828 |
| 33 | 221 | 60 | 43 | 50 | 795 |
| 34 | 222 | 62 | 44 | 57 | 708 |
| 35 | 240 | 61 | 45 | 55 | 600 |
| 36 | 216 | 62 | 47 | 68 | 97 |
| 37 | 242 | 63 | 48 | 68 | 132 |
| 38 | 174 | 62 | 48 | 71 | 207 |
| 39 | 148 | 61 | 45 | 82 | 236 |
| 40 | 147 | 61 | 46 | 82 | 149 |
| 41 | 175 | 61 | 48 | 73 | 97 |
| 42 | 190 | 63 | 48 | — | 70 |
| 43 | 156 | 61 | 44 | — | 95 |
| 44 | 119 | 61 | 45 | — | 112 |
| 45 | 110 | 59 | 41 | — | 141 |
| 46 | 162 | 56 | 47 | 72 | 851 |
| 47 | 237 | 62 | 48 | 53 | 800 |
| 48 | 251 | 62 | 48 | 40 | 807 |
| 49 | 289 | 62 | 47 | 46 | 575 |
| 50 | 217 | 60 | 46 | 59 | 283 |
| 51 | 254 | 64 | 51 | 61 | 301 |
| 52 | 213 | 63 | 48 | 55 | 271 |
| 53 | 215 | 65 | 49 | 49 | 325 |
| 54 | 191 | 63 | 48 | 68 | 702 |
| 55 | 158 | 60 | 46 | 62 | 267 |
| 56 | 219 | 63 | 52 | 64 | 265 |
| 57 | 179 | 62 | 52 | 65 | 326 |
| 58 | 205 | 64 | 49 | 71 | 233 |
| 59 | 159 | 64 | 50 | 76 | 421 |
| 60 | 154 | 63 | 46 | 75 | 280 |
| 61 | 247 | 63 | 49 | 54 | 307 |
| 62 | 314 | 65 | 50 | 49 | 715 |
| 63 | 219 | 59 | 45 | 60 | 250 |
| 64 | 206 | 60 | 52 | 50 | 207 |
| 65 | 198 | 62 | 53 | 55 | 319 |
| 66 | 162 | 62 | 53 | 52 | 318 |
| 67 | 215 | 64 | 52 | 65 | 289 |

For the purposes of the present application, "synergism" resulting from the use of a silane of formula I or II in combination with a quaternary ammonium salt shall mean that the effect of using one particular weight of the silane in conjunction with one particular weight of the quaternary ammonium salt either (1) is greater than the sum of (a) the effect of using the aforesaid one particular weight of the silane and (b) the effect of using the aforesaid one particular weight of the quaternary ammonium salt, or (2) is greater than (a) the effect of using two of the aforesaid particular given weights of the silane and (b) the effect of using two of the aforesaid particular given weights of the quaternary ammonium salt. It must, of course, be recognized that each silane of formula I or II is not equally effective in the composition of the present invention and that each quaternary ammonium salt is not equally effective in the composition of the present invention. Similarly, each combination of a silane of formula I or II and a quaternary ammonium salt does not afford an improvement in a given property of the rubber composition of this invention to an equal degree.

The values of $T_{100}$ for Examples 1–15 are plotted in FIG. 1 as a function of the concentration of one of the silane or quaternary ammonium salt while the concentration of the other of the silane or quaternary ammonium salt is held constant. The values of $T_{100}$ for Examples 16–30 are plotted in FIG. 2, also as a function of the concentration of one of the silane or quaternary ammonium salt while the concentration of the other of the silane or quaternary ammonium salt is held constant. The concentration of the agent which is held constant is indicated adjacent each curve in FIGS. 1 and 2. For example, in Curve A in FIG. 1, with no silane (or phr silane) present in the rubber composition, the value of $T_{100}$ increased from 225 to 310 and then decreased to 289, 290 and 241 as the concentration of the quaternary ammonium salt increased from 0 phr to 0.75 phr to 1.5 phr to 2.25 phr to 3.0 phr, respectively. Similarly, in Curve E in FIG. 1, with no quaternary ammonium salt (0 phr salt) present in the rubber composition, the value of $T_{100}$ decreased from 225 to 210 to 224 to 212 to 209 as the concentration of the silane increased from 0 phr to 0.38 phr to 0.75 to 1.13 phr to 1.5 phr, respectively.

In certain applications, for example, rubber compositions for use as tire sidewalls, it is very desirable to have as high a tensile strength as possible. Comparison of Curves E and F in FIG. 1 indicates that, although in the absence of methyl-1-oleyl amido ethyl-2-oleyl imidazolinium-methyl-sulfate the presence of 3-methacryloxypropyl-trimethoxysilane has no or even a negative effect on the tensile strength of the resulting rubber composition, additions of the silane have a very positive effect on the tensile strength when 0.75 phr of the salt is also present in the rubber composition. Comparison of Curves F, G and H indicates, however, that this positive effect decreases when 1.5 phr of the salt is present and even is converted to a negative effect when 2.25 phr of the salt is present. Comparison of Curves A, B, C and D in FIG. 1 illustrates that the presence of the salt has a very positive effect on the tensile strength even in the absence of the silane and that this positive effect is substantially enhanced in the presence of the silane. Furthermore, this enhancement cannot be accounted for by combining the effects of the salt alon and the silane alone since the presence of the silane alone has little effect on the tensile strength. Furthermore, comparison of Curves A, D, E and F in FIG. 1 indicates that the use of the silane in conjunction with the salt affords a rubber composition having a substantially greater tensile strength than when an even greater amount of either the silane alone or the salt alone is used in the rubber composition.

Figure 2:
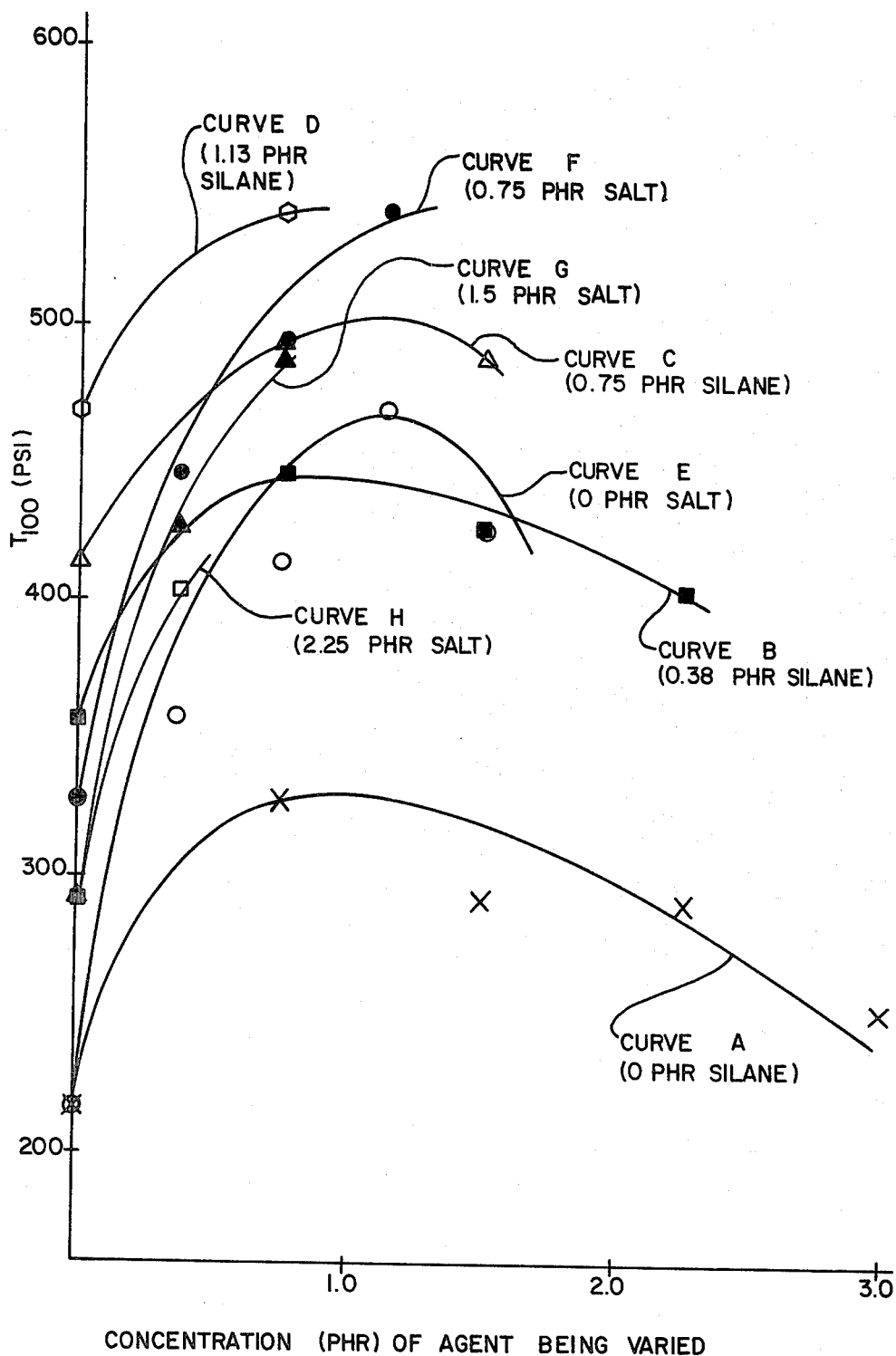
FIG. 2 is a series of plots illustrating the variation of the tensile strength of a rubber composition at 100 percent elongation as a function of the concentrations of bis[3-(triethoxysilyl)propyl] tetrasulfide and tallow trimethyl ammonium chloride in another set of embodiments of this invention.

Reference to Curves A and E in FIG. 2 indicates that, by contrast to the rubber composition data plotted in FIG. 1, use of both the silane bis[3-(triethoxysilyl)-propyl]tetrasulfide alone and the quaternary ammonium salt (tallow trimethyl ammonium chloride) alone in rubber compositions afforded significant improvements to the tensile strength of the resulting rubber composition. Nevertheless, as in FIG. 1, comparison of Curves A, D, E and F in FIG. 2 indicates that use of the silane in conjunction with the salt affords rubber compositions having substantially greater strengths than when even greater amounts of either the silane alone or the salt alone is used in the rubber composition.

Tan Delta is another property illustrating the unexpectedly beneficial effect of the combined use of a silane or formula I or II with a quaternary ammonium salt in rubber compositions. Generally, it is desired to maximize M' and minimize M" and hence to minimize Tan Delta. The values of Tan Delta for Examples 1–15 are plotted in FIG. 3 as a function of the concentration of one of the silane or quaternary ammonium salt while the concentration of the other of the silane or quaternary ammonium salt is held constant. The values of Tan Delta for Examples 16–30 are plotted in FIG. 4, also as a function of the concentration of one of the silane or quaternary ammonium salt while the concentration of the other of the silane or quaternary ammonium salt is held constant. The concentration of the agent which is held constant is indicated for each curve in FIGS. 3 and 4. For example, in Curve A in FIG. 3, with no silane present in the rubber composition, the value of Tan Delta decreased from 0.211 to 0.168 and then increased to 0.178 to 0.191 and to 0.198 as the concentration of the quaternary ammonium salt increased from 0 phr to 0.75 phr to 1.5 phr to 2.25 phr to 3 phr, respectively. Similarly, in Curve E in FIG. 3, with no quaternary ammonium salt present, the value of Tan Delta increased from 0.211 to 0.219 to 0.218, 0.218 and 0.221 as the concentration of the silane increased from 0 phr to 0.38 phr to 0.75 phr, 1.13 phr to 1.5 phr, respectively.

Figure 3:
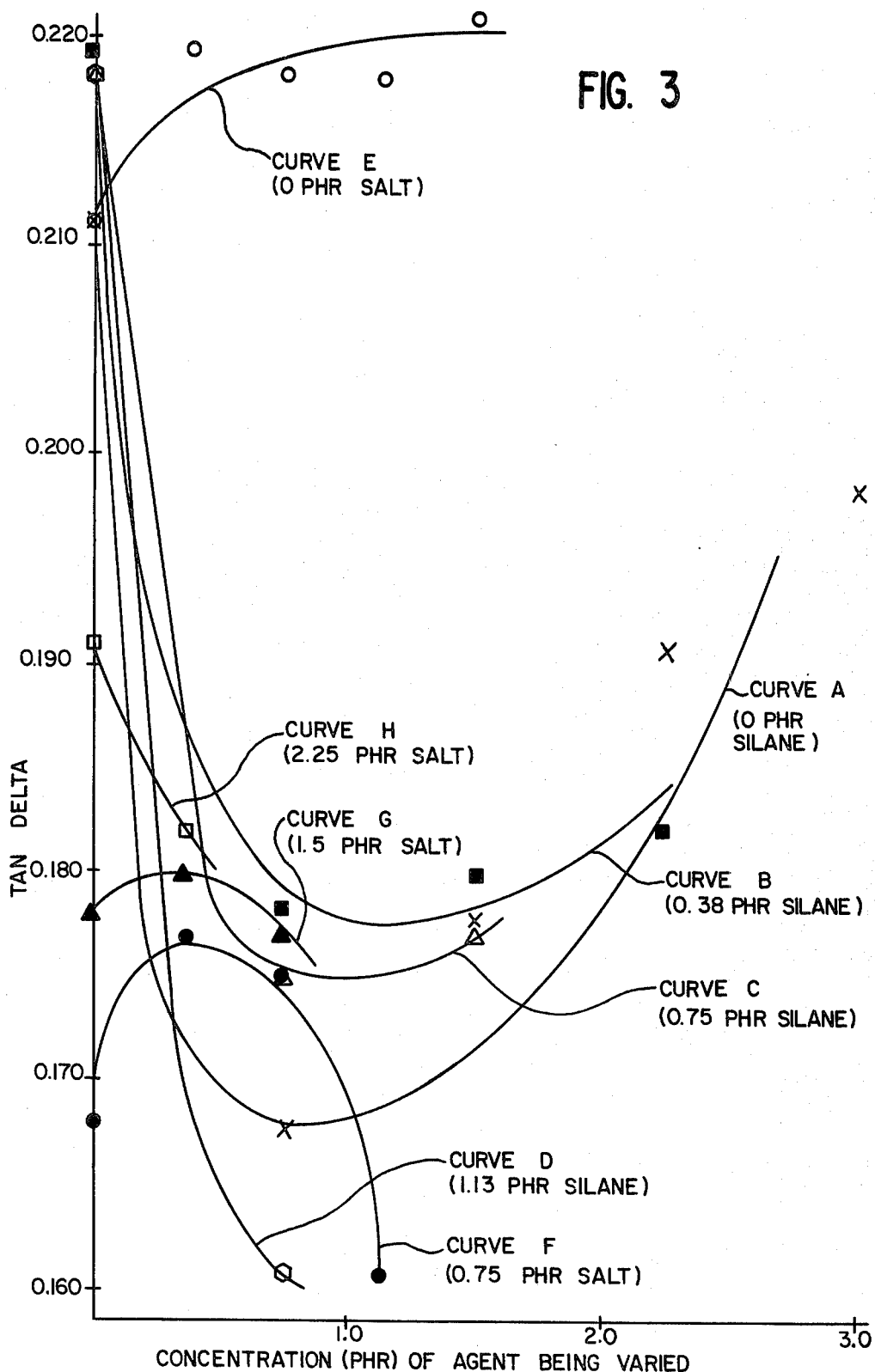
FIG. 3 is a series of plots illustrating the variation of Tan Delta as a function of the concentrations of 3-methacryloxypropyltrimethoxysilane and 1-methyl-1-oleyl amido ethyl-2-oleyl imidazolinium methyl sulfate in the same set of embodiments of the invention to which FIG. 1 pertains.

The data plotted in FIG. 3 illustrates a synergistic improvement in Tan Delta as a result of the use of the organosilane and quaternary ammonium salt together in the composition of this invention. One basis for the synergism illustrated by the data in FIG. 3 is that, as indicated by Curve E, the addition of the silane at levels up to 1.5 phr results in an increase—that is, worsening—of the value of Tan Delta. By contrast, as indicated by reference to Curves F, G, and H in FIG. 3, the negative effect of the addition of the silane is converted to a positive effect when the quaternary ammonium salt is also present in the rubber composition of this invention. For example, reference to Curve H indicates that when the salt is present at a level of 2.25 phr, the addition of 0.38 phr of the silane unexpectedly results in a further improvement or decrease in the value of Tan Delta, instead of worsening the value of Tan Delta as illustrated by Curve E. Reference to Curves F, G, and H in FIG. 3 indicates that this positive effect reaches a maximum with 0.75 phr of the salt being present and decreases with greater salt concentrations. Furthermore, reference to Curves A and D indicates that the beneficial effects on the value of Tan Delta stemming from the addition of the salt are further enhanced by the presence of 1.13 phr of the silane. Furthermore, comparison of Curves A, D, E and F in FIG. 3 illustrates that the use of the silane in conjunction with the salt affords a rubber composition having a lower Tan Delta than rubber compositions having even greater concentrations of either the silane alone or the salt alone.

Figure 4:
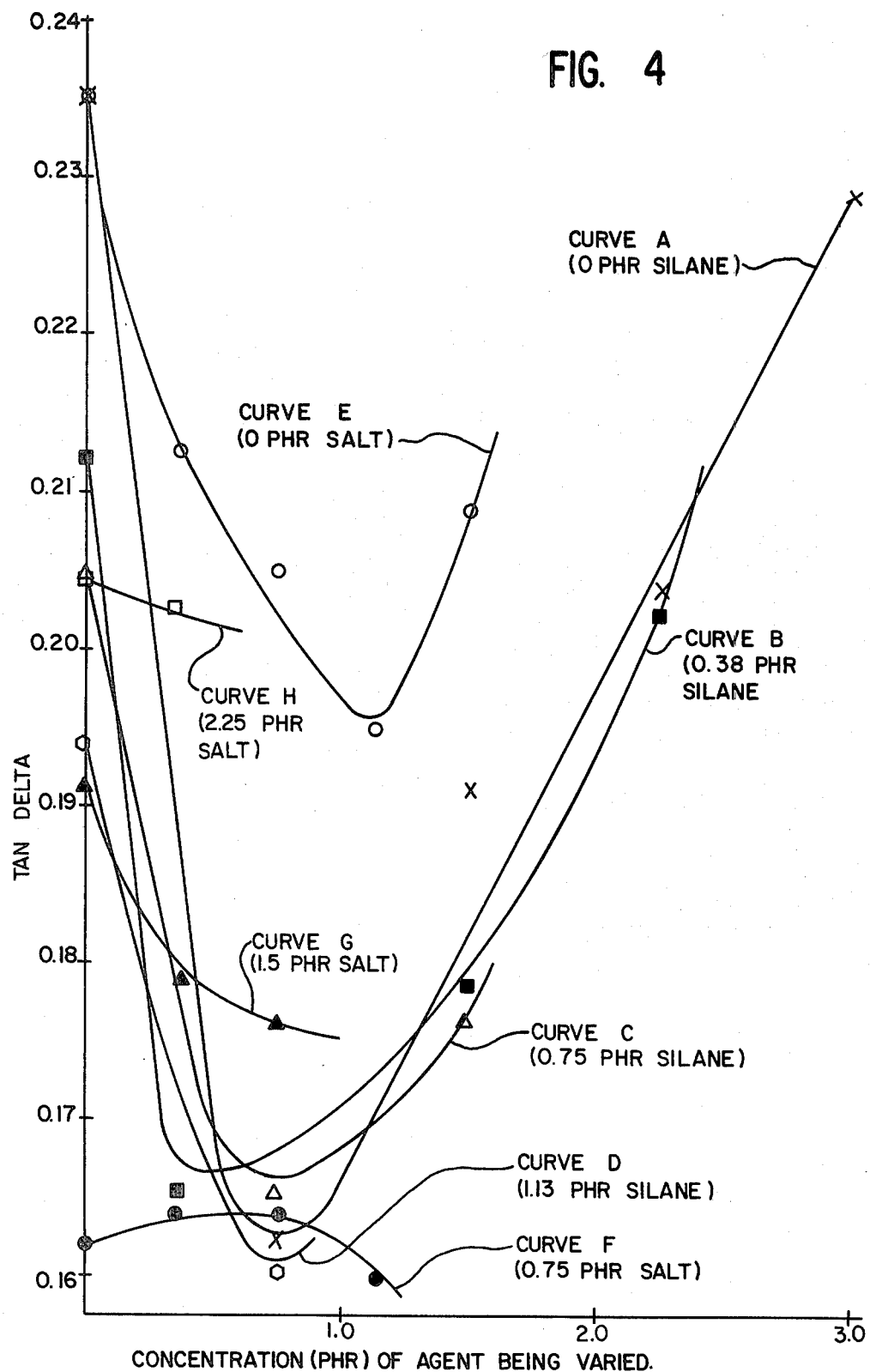
FIG. 4 is a series of plots illustrating the variation of Tan Delta as a function of the concentrations of bis[3-(triethoxysilyl)propyl] tetrasulfide and tallow trimethyl ammonium chloride in the same set of embodiments to which FIG. 2 pertains.

Reference to Curves A, E and F in FIG. 4 illustrates further that the use of the silane in conjunction with the salt affords a rubber composition having a lower Tan Delta than do rubber compositions having even greater concentrations of either the silane alone or the salt alone. Furthermore, Curve F in FIG. 4 indicates that the reduced values of Tan Delta are achieved over a wider range of silane concentrations, as opposed to the other embodiments for which data are plotted in FIG. 4.

Comparison of the results of Examples 31–45 indicates that by contrast to methyl-1-oleyl amido ethyl-2-oleyl imidazolinium methyl sulfate, ditallow dimethyl ammonium chloride, in the absence of a silane of formula I, has only a small positive or even a negative effect on the tensile strength of the rubber composition in which it is present. Similarly, the results of Examples 31–45 indicate that, by contrast to 3-methacryloxypropyl trimethoxysilane, 3-aminopropyltriethoxysilane, in the absence of a quaternary ammonium salt has a very significant positive effect on the tensile strength of the rubber composition in which it is present. Nevertheless, the results of Examples 3–45 indicate that addition of 1.13 phr of the silane substantially enhances the small positive effect of the presence of the salt in the absence of the silane. Similarly, the results of Examples 31–45 indicate that the addition of 0.75 phr of the salt significantly enhances the already substantially positive effect of the silane on the tensile strength of the rubber composition in which it is present. This enhancement cannot be accounted for by combining the effects of the salt alone and the silane alone. Furthermore, the results of Examples 31–45 indicate that the use of the silane in conjunction with the salt affords a rubber composition having substantially greater tensile strength than when an even greater amount of either the silane alone or the salt alone is used in the rubber composition. Similarly, the results of Examples 31–45 illustrate that the use of an organosilane of formula I or II in conjunction with a quaternary ammonium salt affords a rubber composition having a lower Tan Delta than do rubber compositions having even greater concentrations of either the silane alone or the salt alone.

However, these conclusions drawn from the results of Examples 31–45 must be tempered by the results of Examples 46–60, a series of experiments similar to Examples 31–45, respectively. By contrast to the results of Examples 31–45, the results of Examples 46–60 demonstrate that ditallow dimethyl ammonium chloride, in the absence of the organosilane, has a greater beneficial effect on the tensile strength and Tan Delta and that the particular combination of the organosilane and quaternary ammonium salt employed does not afford a synergistic improvement of the tensile strength and Tan Delta. Nevertheless, the results of Examples 46–60 otherwise exhibit similar trends as do the results of Examples 31–45 and confirm that the replacement of some of the organosilane by the quaternary ammonium salt does not have an adverse effect on the tensile strength and Tan Delta, relative to their values for a rubber composition containing the organosilane alone and at a concentration level which is essentially equivalent to the combined concentrations of the organosilane and quaternary ammonium salt in such combinations.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

Having described the invention, what is claimed is:

1. A rubber composition formed according to an improved rubber compounding process comprising mixing and substantially uniformly dispersing in natural or synthetic rubber the following:
    A.
      1. particulate Agent G at a level of from about 5 to about 200 phr,
      2. Agent H at a level of from about 0.005 to about 15 phr, and
      3. Agent I at a level of from about 0.005 to about 15 phr; or
    B.
      1. a particulate adduct of Agents G and H having a median particle size in the range of from about 0.01 to about 20 microns and present at a level such that the portion thereof contributed from Agent G is at a level of from about 5 to about 200 phr and the portion thereof contributed from Agent H is at a level of from about 0.005 to about 15 phr, and
      2. Agent I at a level of from about 0.005 to about 15 phr; or
    C.
      1. a particulate adduct of Agents G and I having a median particle size in the range of from about 0.01 to about 20 microns and present at a lever such that the portion thereof contributed from Agent G is at a level of from about 5 to about 200 phr and the portion thereof contributed from Agent I is at a level of from about 0.005 to about 15 phr, and
      2. Agent H at a level of from about 0.005 to about 15 phr; or
    D. a particulate adduct of Agents G, H, and I having a median particle size in the range of from about 0.01 to about 20 microns and present at a level such that the portion thereof contributed from Agent G is at a level of from about 5 to about 200 phr, the portion thereof contributed from Agent H is at a level of from about 0.005 to about 15 phr and the portion thereof contributed from Agent I is at a level of from about 0.005 to about 15 phr; or
    E.
      1. a particulate adduct of Agents G and H having a median particle size in the range of from about 0.01 to about 20 microns and present at a level such that the portion thereof contributed from Agent G is at a level of from about 2.5 to about 100 phr and the portion thereof contributed from Agent H is at a level of from about 0.005 to about 15 phr, and
      2. a particulate adduct of Agents G and I having a median particle size in the range of from about 0.01 to about 20 microns and present at a level such that the portion thereof contributed from Agent G is at a level of from about 2.5 to about 100 phr and the portion thereof contributed from Agent I is at a level of from about 0.005 to about 15 phr;

wherein Agent G comprises phyllosilicate mineral particles having a median particle size in the range of from about 0.01 to about 20 microns;

wherein Agent H comprises an organosilane of formula I or II

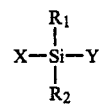  (I)

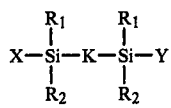  (II)

wherein X is a group which is, or which upon hydrolysis forms a group which is, capable of reacting with a reactive site on the phyllosilicate mineral particles so as to form a bond between the organosilane of formula I or II and the phyllosilicate mineral particles, wherein Y is an alkyl, aryl or alkyl-substituted aryl group containing from 1 to 40 carbon atoms and bears a functional group capable of reacting with a reactive site on the rubber so as to form a bond between the organosilane of formula I or II and the rubber, wherein $R_1$ and $R_2$ are the same of different and are each selected from the group consisting of the groups described by X and Y, an alkyl group containing from 1 to 20 carbon atoms, an aryl group, and an alkyl-substituted aryl group wherein the alkyl substituents contain a total of from 1 to 20 carbon atoms, and wherein K is an alkylenyl group containing from 1 to 20 carbon atoms or an alkyl sulfide or polysulfide group containing from 1 to 6 sulfur atoms and from 2 to 20 carbon atoms; and wherein Agent I comprises a quaternary ammonium salt.

2. The rubber composition of claim 1 wherein the rubber comprises natural or synthetic rubber.

3. The rubber composition of claim 2 wherein the rubber is natural or synthetic rubber.

4. The rubber composition of claim 3 wherein natural rubber, polybutadiene rubber, polyisoprene rubber or styrene-butadiene rubber is employed.

5. The rubber composition of claim 1 wherein a sulfur or sulfur-donating curing agent is employed.

6. The rubber composition of claim 1 wherein the phyllosilicate mineral is selected from the group consisting of a member of the kaolin group, a member of the mica group, a member of the group characterized by a primitive three-layer structure, a member of the group characterized by an expandable three-layer structure and a member of the group characterized by a four-layer structure.

7. The rubber composition of claim 6 wherein the phyllosilicate mineral is selected from the group consisting of kaolinite, muscovite, pyrophyllite, talc, vermiculite and chlorite.

8. The rubber composition of claim 7 wherein the phyllosilicate mineral is talc.

9. The rubber composition of claim 1 wherein X is a group which upon hydrolysis forms a hydroxyl group.

10. The rubber composition of claim 1 wherein X is selected from the group consisting of a halogen radical and $-OR_{13}$ and wherein $R_{13}$ is an alkyl group containing from 1 to 20 carbon atoms.

11. The rubber composition of claim 10 wherein X is $-OR_{13}$, and $R_{13}$ contains from 1 to 7 carbon atoms.

12. The rubber composition of claim 1 wherein the functional group on Y which is capable of reacting with a reactive site on the rubber is selected from the group consisting of a mercapto group, allyl group, vinyl group, epoxy group, methacryloxy group, acryloxy group, and an amino group having an active hydrogen atom.

13. The rubber composition of claim 12 wherein the functional group on Y which is capable of reacting with a reactive site on the rubber is selected from the group consisting of a mercapto group, a vinyl group and an amino group having an active hydrogen atom.

14. The rubber composition of claim 1 wherein Y contains from 1 to 6 carbon atoms.

15. The rubber composition of claim 1 wherein $R_1$ and $R_2$ are the same or different and are each selected from the group consisting of the group described by X.

16. The rubber composition of claim 15 wherein $R_1$ and $R_2$ are the same or different and are each selected from the group consisting of a halogen radical and $-OR_{13}$ and wherein $R_{13}$ is an alkyl group containing from 1 to 20 carbon atoms.

17. The rubber composition of claim 16 wherein X, $R_1$ and $R_2$ are the same.

18. The rubber composition of claim 1 wherein the organosilane of formula I or II is selected from the group consisting of 3-aminopropyl-triethoxysilane, 3-mercaptopropyl-trimethoxysilane and vinyl-tri-(2-methoxyethoxy) silane.

19. The rubber composition of claim 1 wherein the quaternary ammonium salt has a structure of formula III, IV, V, VI or VII:

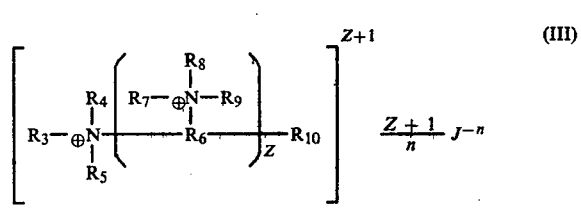  (III)

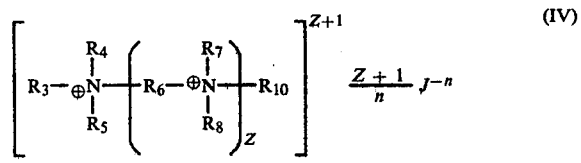  (IV)

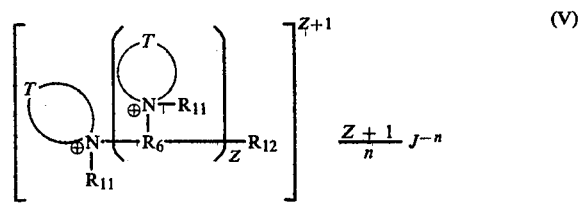  (V)

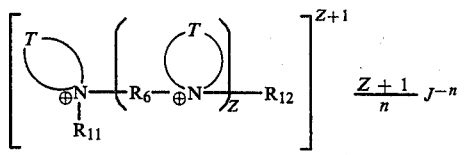

(VI)

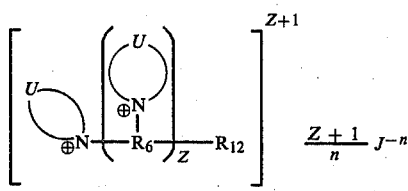

(VII)

wherein Z is zero or a positive integer from 1 to 100, J is an anionic radical, n is the absolute value of the oxidation state of J, and $R_6$ is an alkylenyl radical containing from 2 to 20 carbon atoms or an aryl radical containing from 6 to 14 carbon atoms, wherein in formulas III and IV, $R_3$, $R_4$, $R_5$, $R_7$, $R_8$ and $R_9$ are the same or different and are each selected from the group consisting of: aliphatic radicals containing a total of from 1 to 3 carbon atoms which are saturated or unsaturated and unsubstituted or substituted with at least one hydroxy or alkoxy group; aliphatic radicals containing a total of from 8 to 40 carbon atoms which are saturated or unsaturated and unsubstituted or substituted with at least one hydroxy, alkoxy or polyalkoxy group; aryl radicals containing from 6 to 18 carbon atoms; and saturated or unsaturated araliphatic radicals containing a total of from 7 to 48 carbon atoms, wherein in formulas III and IV, when Z is zero, $R_{10}$ is selected from the group consisting of the groups described by $R_3$, $R_4$, $R_5$, $R_7$, $R_8$ and $R_9$, and when Z is a positive integer, $R_{10}$ is selected from the group consisting of the groups described by $R_3$, $R_4$, $R_5$, $R_7$, $R_8$ and $R_9$ and a hydrogen atom, wherein in formulas III and IV, (1) at least one of $R_3$, $R_4$, $R_5$, $R_7$, $R_8$, $R_9$ and $R_{10}$ is an aliphatic radical containing a total of from 1 to 3 carbon atoms and (2) either (a) at least one of $R_3$, $R_4$, $R_5$, $R_7$, $R_8$, $R_9$ and $R_{10}$ is an aliphatic radical containing at least 12 carbon atoms or (b) at least two of $R_3$, $R_4$, $R_5$, $R_7$, $R_8$, $R_9$ and $R_{10}$ are aliphatic radicals containing at least 8 carbon atoms, wherein in formulas V, VI and VII, each of T and U is a radical which, in conjunction with each nitrogen atom to which it is shown attached in formula V, VI or VII, forms a heterocyclic radical containing at least one nitrogen atom in the ring system and containing only nitrogen and carbon atoms in the ring system, and the T and U portions of the ring system are unsubstituted or substituted by at least one alkyl group with the total number of ring substituents on each of T and U being from 1 to 32 carbon atoms, wherein in formulas V and VI, $R_{11}$ is selected from the group consisting of the groups described by $R_3$, $R_4$, $R_5$, $R_7$, $R_8$ and $R_9$ and alkylamidoalkyl or alkylesteralkyl groups containing a total of at least 14 carbon atoms, and wherein in formulas V, VI and VII, when Z is zero, $R_{12}$ is selected from the group consisting of the groups described by $R_{11}$, and when Z is a positive integer, $R_{12}$ is selected from the group consisting of the groups described by $R_{11}$ and a hydrogen atom.

20. The rubber composition of claim 19 wherein, in each of formulas III, IV, V, VI and VII, at least one of $R_3$, $R_4$, $R_5$, $R_7$, $R_8$, $R_9$, $R_{10}$, $R_{11}$ and $R_{12}$ is a methyl radical.

21. The rubber composition of claim 19 wherein, in each of formulas III, IV, V, VI and VII, at least one of $R_3$, $R_4$, $R_5$, $R_7$, $R_8$, $R_9$, $R_{10}$, $R_{11}$ and $R_{12}$ is an aliphatic radical containing from 12 to 22 carbon atoms.

22. The rubber composition of claim 19 wherein, in each of formulas III, IV, V, VI and VII, at least one of $R_3$, $R_4$, $R_5$, $R_7$, $R_8$, $R_9$, $R_{10}$, $R_{11}$ and $R_{12}$ is an aliphatic radical containing a polyalkoxy radical containing from 2 to 15 repeating ethoxy radical units.

23. The rubber composition of claim 19 wherein, in each of formulas III, IV, V, VI and VII, at least one of $R_3$, $R_4$, $R_5$, $R_7$, $R_8$, $R_9$, $R_{10}$, $R_{11}$ and $R_{12}$ is an araliphatic radical containing from 7 to 22 carbon atoms.

24. The rubber composition of claim 19 wherein $R_6$ is an alkylenyl radical containing from 2 to 6 carbon atoms.

25. The rubber composition of claim 19 wherein each of T and U is a radical which in conjunction with each nitrogen atom to which it is shown as attached in formula V, VI or VII forms a quaternary ammonium salt selected from the group consisting of pyrrolidinium, pyrrolium, pyrrolinium, imidazolium, pyrazolium, triazolium, pyridinium, pyrimidinium, pyridazinium, pyrazinium, triazinium, indolium, indazolium, benzimidazolium, quinolinium, isoquinolinium, cinnolinium, phthalazinium, quinazolinium, quinoxalinium, naphthyridinium, quinolizinium, carbazolium, acridinium, phenazinium, phenanthridinium, phenanthrolinium, benzoisoquinolinium, purinium, porphinium, and pteridinium, the heterocyclic rings being unsubstituted or substituted by at least one alkyl group, and the quaternary ammonium salts formed by partial or complete hydrogenation of the heterocyclic rings of any of the aforesaid quaternary ammonium salts.

26. The rubber composition of claim 19 wherein Z is zero or a positive integer from 1 to 5.

27. The rubber composition of claim 26 wherein Z is zero or 1.

28. The rubber composition of claim 19 wherein J is an inorganic radical.

29. The rubber composition of claim 1 wherein the median particle size of Agent G and of the adducts is in the range of from about 0.1 to about 5 microns.

30. The rubber composition of claim 1 wherein Agent G and the portions of the adducts contributed from Agent G are each at a level of from about 50 to about 150 phr.

31. The rubber composition of claim 1 wherein Agent H and the portions of the adducts contributed from Agent H are each at a level of from about 0.02 to about 3 phr.

32. The rubber composition of claim 1 wherein Agent I and the portions of the adducts contributed from Agent I are each at a level of from about 0.02 to about 3 phr.

33. A rubber composition comprising a substantially uniform dispersion in natural or synthetic rubber of:

A.
  1. particulate Agent G at a level of from about 5 to about 200 phr,
  2. Agent H at a level of from about 0.005 to about 15 phr, and 3. Agent I at a level of from about 0.005 to about 15 phr; or B.
1. a particulate adduct of Agents G and H having a median particle size in the range of from about 0.01 to about 20 microns and present at a level such that the portion thereof contributed from Agent G is at a level of from about 5 to about 200 phr and the portion thereof contributed from Agent H is at a level of from about 0.005 to about 15 phr, and
2. Agent I at a level of from about 0.005 to about 15 phr; or C.
1. a particulate adduct of Agents G and I having a median particle size in the range of from about 0.01 to about 20 microns and present at a level such that the portion thereof contributed from Agent G is at a level of from about 5 to about 200 phr and the portion thereof contributed from Agent I is at a level of from about 0.005 to about 15 phr, and
2. Agent H at a level of from about 0.005 to about 15 phr; or D. a particulate adduct of Agents G, H, and I having a median particle size in the range of from about 0.01 to about 20 microns and present at a level such that the portion thereof contributed from Agent G is at a level of from about 5 to about 200 phr, the portion thereof contributed from Agent H is at a level of from about 0.005 to about 15 phr and the portion thereof contributed from Agent I is at a level of from about 0.005 to about 15 phr; or E.
1. a particulate adduct of Agents G and H having a median particle size in the range of from about 0.01 to about 20 microns and present at a level such that the portion thereof contributed from Agent G is at a level of from about 2.5 to about 100 phr and the portion thereof contributed from Agent H is at a level of from about 0.005 to about 15 phr, and
2. a particulate adduct of Agents G and I having a median particle size in the range of from about 0.01 to about 20 microns and present at a level such that the portion thereof contributed from Agent G is at a level of from about 2.5 to about 100 phr and the portion thereof contributed from Agent I is at a level of from about 0.005 to about 15 phr; or F. B, C, D or E above wherein the particulate adduct in B, C or D or at least one of the particulate adducts in E is also an adduct with the rubber;

wherein Agent G comprises phyllosilicate mineral particles having a median particle size in the range of from about 0.01 to about 20 microns;

wherein Agent H comprises an organosilane of formula I or II

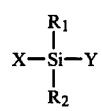
(I)

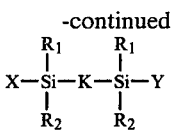
(II)

wherein X is a group which is, or which upon hydrolysis forms a group which is, capable of reacting with a reactive site on the phyllosilicate mineral particles so as to form a bond between the organosilane of formula I or II and the phyllosilicate mineral particles, wherein Y is an alkyl, aryl or alkyl-substituted aryl group containing from 1 to 40 carbon atoms and bears a functional group capable of reacting with a reactive site on the rubber so as to form a bond between the organosilane of formula I or II and the rubber, wherein $R_1$ and $R_2$ are the same or different and are each selected from the group consisting of the groups described by X and Y, an alkyl group containing from 1 to 20 carbon atoms, an aryl group, and an alkyl-substituted aryl group wherein the alkyl substituents contain a total of from 1 to 20 carbon atoms, and wherein K is an alkylenyl group containing from 1 to 20 carbon atoms or an alkyl sulfide or polysulfide group containing from 1 to 6 sulfur atoms and from 2 to 20 carbon atoms; and wherein Agent I comprises a quaternary ammonium salt.

34. The rubber composition of claim 33 wherein the rubber comprises natural or synthetic rubber.

35. The rubber composition of claim 34 wherein the rubber is natural or synthetic rubber.

36. The rubber composition of claim 35 wherein the rubber is natural rubber, polybutadiene rubber, polyisoprene rubber or styrene-butadiene rubber.

37. The rubber composition of claim 33 formed by a vulcanization process employing a sulfur or sulfur-donating curing agent.

38. The rubber composition of claim 33 wherein the phyllosilicate mineral is selected from the group consisting of a member of the kaolin group, a member of the mica group, a member of the group characterized by a primitive three-layer structure, a member of the group characterized by an expandable three-layer structure and a member of the group characterized by a four-layer structure.

39. The rubber composition of claim 38 wherein the phyllosilicate mineral is selected from the group consisting of kaolinite, muscovite, pyrophyllite, talc, vermiculite and chlorite.

40. The rubber composition of claim 39 wherein the phyllosilicate mineral is talc.

41. The rubber composition of claim 33 wherein X is a group which upon hydrolysis forms a hydroxyl group.

42. The rubber composition of claim 33 wherein X is selected from the group consisting of a halogen radical and $-OR_{13}$ and wherein $R_{13}$ is an alkyl group containing from 1 to 20 carbon atoms.

43. The rubber composition of claim 42 wherein X is $-OR_{13}$ and $R_{13}$ contains from 1 to 7 carbon atoms.

44. The rubber composition of claim 33 wherein the functional group on Y which is capable of reacting with a reactive site on the rubber is selected from the group consisting of a mercapto group, allyl group, vinyl group, epoxy group, methacryloxy group, acryloxy group and an amino group having an active hydrogen atom.

45. The rubber composition of claim 44 wherein the functional group on Y which is capable of reacting with a reactive site on the rubber is selected from the group consisting of mercapto, vinyl and an amino group having an active hydrogen atom.

46. The rubber composition of claim 33 wherein Y contains from 1 to 6 carbon atoms.

47. The rubber composition of claim 33 wherein $R_1$ and $R_2$ are the same or different and are each selected from the group consisting of the group described by X.

48. The rubber composition of claim 47 wherein $R_1$ and $R_2$ are the same or different and are each selected from the group consisting of a halogen radical and $-OR_{13}$ and wherein $R_{13}$ is an alkyl group containing from 1 to 20 carbon atoms.

49. The rubber composition of claim 48 wherein X, $R_1$ and $R_2$ are the same.

50. The rubber composition of claim 33 wherein the organosilane of formula I or II is selected from the group consisting of 3-aminopropyl-triethoxysilane, 3-mercaptopropyl-trimethoxysilane, and vinyl-tri-(2-methoxyethoxy) silane.

51. The rubber composition of claim 33 wherein the quaternary ammonium salt has a structure of formula III, IV, V, VI or VII:

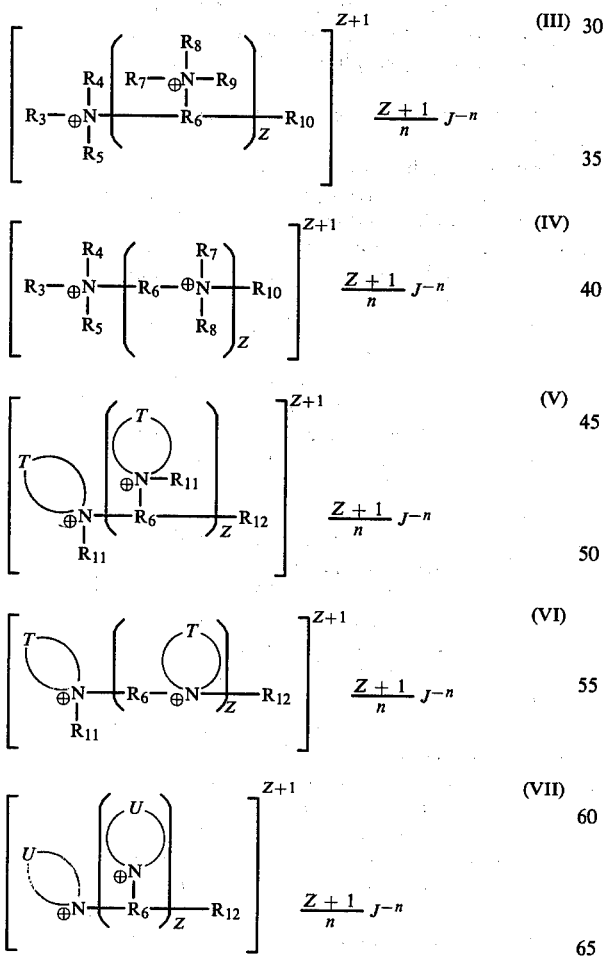

wherein Z is zero or a positive integer from 1 to 100, J is an anionic radical, n is the absolute value of the oxidation state of J, and $R_6$ is an alkylenyl radical containing from 2 to 20 carbon atoms or an aryl radical containing from 6 to 14 carbon atoms, wherein in formulas III and IV, $R_3$, $R_4$, $R_5$, $R_7$, $R_8$ and $R_9$ are the same or different and are each selected from the group consisting of: aliphatic radicals containing a total of from 1 to 3 carbon atoms which are saturated or unsaturated and unsubstituted or substituted with at least one hydroxy or alkoxy group; aliphatic radicals containing a total of from 8 to 40 carbon atoms which are saturated or unsaturated and unsubstituted or substituted with at least one hydroxy, alkoxy or polyalkoxy group; aryl radicals containing from 6 to 18 carbon atoms; and saturated or unsaturated araliphatic radicals containing a total of from 7 to 48 carbon atoms, wherein in formulas III and IV, when Z is zero, $R_{10}$ is selected from the group consisting of the groups described by $R_3$, $R_4$, $R_5$, $R_7$, $R_8$ and $R_9$, and when Z is a positive integer, $R_{10}$ is selected from the group consisting of the groups described by $R_3$, $R_4$, $R_5$, $R_7$, $R_8$ and $R_9$ and a hydrogen atom, wherein in formulas III and IV, (1) at least one of $R_3$, $R_4$, $R_5$, $R_7$, $R_8$, $R_9$ and $R_{10}$ is an aliphatic radical containing a total of from 1 to 3 carbon atoms and (2) either (a) at least one of $R_3$, $R_4$, $R_5$, $R_7$, $R_8$, $R_9$ and $R_{10}$ is an aliphatic radical containing at least 12 carbon atoms or (b) at least two of $R_3$, $R_4$, $R_5$, $R_7$, $R_8$, $R_9$ and $R_{10}$ are aliphatic radicals containing at least 8 carbon atoms, wherein in formulas V, VI and VII, each of T and U is a radical which, in conjunction with each nitrogen atom to which it is shown attached in formula V, VI or VII, forms a heterocyclic radical containing at least one nitrogen atom in the ring system and containing only nitrogen and carbon atoms in the ring system, and the T and U portions of the ring system are unsubstituted or substituted by at least one alkyl group with the total number of ring substituents on each of T and U being from 1 to 32 carbon atoms, wherein in formulas V and VI, $R_{11}$ is selected from the group consisting of the groups described by $R_3$, $R_4$, $R_5$, $R_7$, $R_8$ and $R_9$ alkylamidoalkyl or alkylesteralkyl groups containing a total of at least 14 carbon atoms, and wherein in formulas V, VI and VII, when Z is zero, $R_{12}$ is selected from the group consisting of the groups described by $R_{11}$ and when Z is a positive integer, $R_{12}$ is selected from the group consisting of the groups described by $R_{11}$ and a hydrogen atom.

52. The rubber composition of claim 51 wherein, in each of formulas III, IV, V, VI, and VII, at least one of $R_3$, $R_4$, $R_5$, $R_7$, $R_8$, $R_9$, $R_{10}$, $R_{11}$ and $R_{12}$ is a methyl radical.

53. The rubber composition of claim 51 wherein, in each of formulas III, IV, V, VI and VII, at least one of $R_3$, $R_4$, $R_5$, $R_7$, $R_8$, $R_9$, $R_{10}$, $R_{11}$ and $R_{12}$ is an aliphatic radical containing from 12 to 22 carbon atoms.

54. The rubber composition of claim 51 wherein, in each of formulas III, IV, V, VI and VII, at least one of $R_3$, $R_4$, $R_5$, $R_7$, $R_8$, $R_9$, $R_{10}$, $R_{11}$ and $R_{12}$ is an aliphatic radical containing a polyalkoxy radical containing from 2 to 15 repeating ethoxy radical units.

55. The rubber composition of claim 51 wherein, in each of formulas III, IV, V, VI and VII at least one of $R_3$, $R_4$, $R_5$, $R_7$, $R_8$, $R_9$, $R_{10}$, $R_{11}$ and $R_{12}$ is an araliphatic radical containing from 7 to 22 carbon atoms.

56. The rubber composition of claim 51 wherein $R_6$ is an alkenyl radical containing from 2 to 6 carbon atoms.

57. The rubber composition of claim 51 wherein each of T and U is a radical which in conjunction with each nitrogen atom to which it is shown as attached in formula V, VI or VII forms a quaternary ammonium salt selected from the group consisting of pyrrolidinium, pyrrolium, pyrrolinium, imidazolium, pyrazolium, triazolium, pyridinium, pyrimidinium, pyridazinium, pyrazininium, triazinium, indolium, indazolium, benzimidazolium, quinolinium, isoquinolinium, cinnolinium, phthalazinium, quinazolinium, quinoxalinium, naphthyridinium, quinolizinium, carbazolium, acridinium, phenazinium, phenanthridinium, phenanthrolinium, benzo[H]isoquinolinium, purinium, porphinium, and pteridinium, the heterocyclic rings being unsubstituted or substituted by at least one alkyl group, and the quaternary ammonium salts formed by partial or complete hydrogenation of the heterocyclic rings of any of the aforesaid quaternary ammonium salts.

58. The rubber composition of claim 51 wherein Z is zero or a positive integer from 1 to 5.

59. The rubber composition of claim 58 wherein Z is zero or 1.

60. The rubber composition of claim 51 wherein J is an inorganic radical.

61. The rubber composition of claim 33 wherein the median particle size of Agent G and the adducts is in the range of from about 0.1 to about 5 microns.

62. The rubber composition of claim 33 wherein Agent G and the portions of the adducts contributed from Agent G are each at a level of from about 50 to about 150 phr.

63. The rubber composition of claim 33 wherein Agent H and the portions of the adducts contributed from Agent H are each at a level of from about 0.02 to about 3 phr.

64. The rubber composition of claim 33 wherein Agent I and the portions of the adducts contributed from Agent I are each at a level of from about 0.02 to about 3 phr.

65. A particulate adduct of Agents G, H, and I having a median particle size in the range of from about 0.01 to about 20 microns, wherein the concentration levels of Agents H and I are each in the range of from about 0.1 to about 7.5 weight percent, based on the weight of Agent G;

wherein Agent G comprises phyllosilicate mineral particles having a median particle size in the range of from about 0.01 to about 20 microns;

wherein Agent H comprises an organosilane of formula I or II

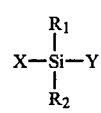

(I)

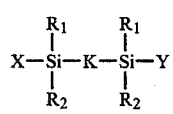

(II)

wherein X is a group which is, or which upon hydrolysis forms a group which is, capable of reacting with a reactive site on the phyllosilicate mineral particles so as to form a bond between the organosilane of formula I or II and the phyllosilicate mineral particles, wherein Y is an alkyl, aryl or alkyl-substituted aryl group containing from 1 to 40 carbon atoms and bears a functional group capable of reacting with a reactive site on the rubber so as to form a bond between the organosilane of formula I or II and the rubber, wherein $R_1$ and $R_2$ are the same or different and are each selected from the group consisting of the groups described by X and Y, an alkyl group containing from 1 to 20 carbon atoms, an aryl group, and an alkyl-substituted aryl group wherein the alkyl substituents contain a total of from 1 to 20 carbon atoms, and wherein K is an alkylenyl group containing from 1 to 20 carbon atoms or an alkyl sulfide or polysulfide group containing from 1 to 6 sulfur atoms and from 2 to 20 carbon atoms; and wherein Agent I comprises a quaternary ammonium salt.

66. The adduct of claim 65 wherein the phyllosilicate mineral is selected from the group consisting of a member of the kaolin group, a member of the mica group, a member of the group characterized by a primitive three-layer structure, a member of the group characterized by an expandable three-layer structure and a member of the group characterized by a four-layer structure.

67. The adduct of claim 66 wherein the phyllosilicate mineral is selected from the group consisting of kaolinite, muscovite, pyrophyllite, talc, vermiculite and chlorite.

68. The adduct of claim 67 wherein the phyllosilicate mineral is talc.

69. The adduct of claim 65 wherein X is a group which upon hydrolysis forms a hydroxyl group.

70. The adduct of claim 65 wherein X is selected from the group consisting of a halogen radical and —$OR_{13}$ and wherein $R_{13}$ is an alkyl group containing from 1 to 20 carbon atoms.

71. The adduct of claim 70 wherein X is —$OR_{13}$, and $R_{13}$ contains from 1 to 7 carbon atoms.

72. The adduct of claim 65 wherein the functional group on Y which is capable of reacting with a reactive site on the rubber is selected from the group consisting of a mercapto group, allyl group, vinyl group, epoxy group, methacryloxy group, acryloxy group, and an amino group having an active hydrogen atom.

73. The adduct of claim 72 wherein the functional group on Y which is capable of reacting with a reactive site on the rubber is selected from the group consisting of a mercapto group, a vinyl group and an amino group having an active hydrogen atom.

74. The adduct of claim 65 wherein Y contains from 1 to 6 carbon atoms.

75. The adduct of claim 65 wherein $R_1$ and $R_2$ are the same or different and are each selected from the group consisting of the group described by X.

76. The adduct of claim 75 wherein $R_1$ and $R_2$ are the same or different and are each selected from the group consisting of a halogen radical and —$OR_{13}$ and wherein $R_{13}$ is an alkyl group containing from 1 to 20 carbon atoms.

77. The adduct of claim 76 wherein X, $R_1$ and $R_2$ are the same.

78. The adduct of claim 65 wherein the organosilane of formula I or II is selected from the group consisting of 3-aminopropyl-triethoxysilane, 3-mercaptopropyl-trimethoxysilane and vinyl-tri-(2-methoxyethoxy)silane.

79. The adduct of claim 65 wherein the quaternary ammonium salt has a structure of formula III, IV, V, VI or VII:

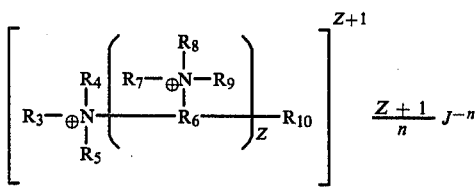 (III)

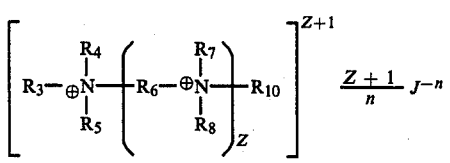 (IV)

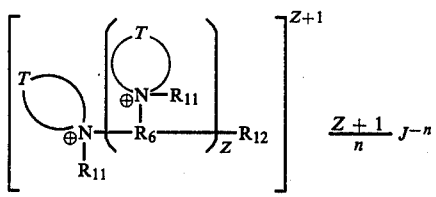 (V)

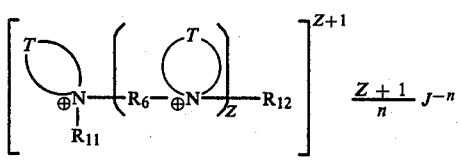 (VI)

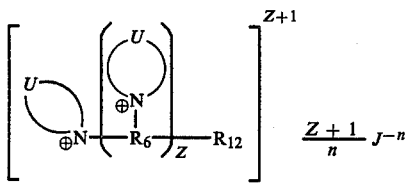 (VII)

wherein Z is zero or a positive integer from 1 to 100, J is an anionic radical, n is the absolute value of the oxidation state of J, and $R_6$ is an alkylenyl radical containing from 2 to 20 carbon atoms or an aryl radical containing from 6 to 14 carbon atoms, wherein in formulas III and IV, $R_3$, $R_4$, $R_5$, $R_7$, $R_8$ and $R_9$ are the same or different and are each selected from the group consisting of: aliphatic radicals containing a total of from 1 to 3 carbon atoms which are saturated or unsaturated and unsubstituted or substituted with at least one hydroxy or alkoxy group; aliphatic radicals containing a total of from 8 to 40 carbon atoms which are saturated or unsaturated and unsubstituted or substituted with at least one hydroxy, alkoxy or polyalkoxy group; aryl radicals containing from 6 to 18 carbon atoms; and saturated or unsaturated araliphatic radicals containing a total of from 7 to 48 carbon atoms, wherein in formulas III and IV, when Z is zero, $R_{10}$ is selected from the group consisting of the groups described by $R_3$, $R_4$, $R_5$, $R_7$, $R_8$ and $R_9$, and when Z is a positive integer, $R_{10}$ is selected from the group consisting of the groups described by $R_3$, $R_4$, $R_5$, $R_7$, $R_8$ and $R_9$ and a hydrogen atom, wherein in formulas III and IV, (1) at least one of $R_3$, $R_4$, $R_5$, $R_7$, $R_8$, $R_9$ and $R_{10}$ is an aliphatic radical containing a total of from 1 to 3 carbon atoms and (2) either (a) at least one of $R_3$, $R_4$, $R_5$, $R_7$, $R_8$, $R_9$ and $R_{10}$ is an aliphatic radical containing at least 12 carbon atoms or (b) at least two of $R_3$, $R_4$, $R_5$, $R_7$, $R_8$, $R_9$ and $R_{10}$ are aliphatic radicals containing at least 8 carbon atoms, wherein in formulas V, VI, and VII, each of T and U is a radical which, in conjunction with each nitrogen atom to which it is shown attached in formula V, VI or VII, forms a heterocyclic radical containing at least one nitrogen atom in the ring system and containing only nitrogen and carbon atoms in the ring system, and the T and U portions of the ring system are unsubstituted or substituted by at least one alkyl group with the total number of ring substituents on each of T and U being from 1 to 32 carbon atoms, wherein in formulas V and VI, $R_{11}$ is selected from the group consisting of the groups described by $R_3$, $R_4$, $R_5$, $R_7$, $R_8$ and $R_9$ and alkylamidoalkyl or alkylesteralkyl groups containing a total of at least 14 carbon atoms, and wherein in formulas V, VI and VII, when Z is zero, $R_{12}$ is selected from the group consisting of the groups described by $R_{11}$, and when Z is a positive integer, $R_{12}$ is selected from the group consisting of the groups described by $R_{11}$ and a hydrogen atom.

80. The adduct of claim 79 wherein, in each of formulas III, IV, V, VI and VII, at least one of $R_3$, $R_4$, $R_5$, $R_7$, $R_8$, $R_9$, $R_{10}$, $R_{11}$ and $R_{12}$ is a methyl radical.

81. The adduct of claim 79 wherein, in each of formulas III, IV, V, VI and VII, at least one of $R_3$, $R_4$, $R_5$, $R_7$, $R_8$, $R_9$, $R_{10}$, $R_{11}$ and $R_{12}$ is an aliphatic radical containing from 12 to 22 carbon atoms.

82. The adduct of claim 79 wherein, in each of formulas III, IV, V, VI and VII, at least one of $R_3$, $R_4$, $R_5$, $R_7$, $R_8$, $R_9$, $R_{10}$, $R_{11}$ and $R_{12}$ is an aliphatic radical containing a polyalkoxy radical containing from 2 to 15 repeating ethoxy radical units.

83. The adduct of claim 79 wherein, in each of formulas III, IV, V, VI and VII, at least one of $R_3$, $R_4$, $R_5$, $R_7$, $R_8$, $R_9$, $R_{10}$, $R_{11}$ and $R_{12}$ is an araliphatic radical containing from 7 to 22 carbon atoms.

84. The adduct of claim 79 wherein $R_6$ is an alkylenyl radical containing from 2 to 6 carbon atoms.

85. The adduct of claim 79 wherein each of T and U is a radical which in conjunction with each nitrogen atom to which it is shown as attached in formula V, VI or VII forms a quaternary ammonium salt selected from the group consisting of pyrrolidinium, pyrrolium, pyrrolinium, imidazolium, pyrazolium, triazolium, pyridinium, pyrimidinium, pyridazinium, pyrazinium, triazinium, indolium, indazolium, benzimidazolium, quinolinium, isoquinolinium, cinnolinium, phthalazinium, quinazolinium, quinoxalinium, naphthyridinium, quinolizinium, carbazolium, acridinium, phenazinium, phenanthridinium, phenanthrolinium, benzo[H]isoquinolinium, purinium, porphinium, and pteridinium, the heterocyclic rings being unsubstituted or substituted by at least one alkyl group, and the quaternary ammonium salts formed by partial or complete hydrogenation of the heterocyclic rings of any of the aforesaid quaternary ammonium salts.

86. The adduct of claim 79 wherein Z is zero or a positive integer from 1 to 5.

87. The adduct of claim 86 wherein Z is zero or 1.

88. The adduct of claim 79 wherein J is an inorganic radical.

89. The adduct of claim 65 having the median particle size in the range of from about 0.1 to about 5 microns.

90. The adduct of claim 65 wherein Agent H is at a level of from about 0.5 to about 1.5 weight percent, based on the weight of Agent G.

91. The adduct of claim 65 wherein Agent I is at a level of from about 0.5 to about 1.5 weight percent, based on the weight of Agent G.

* * * * *

UNITED STATES PATENT OFFICE
CERTIFICATE OF CORRECTION

Page 1 of 2

Patent No. 4,431,755　　　　　　　　　　　Dated February 14, 1984

Inventor(s) WEBER, KENNETH E. - MUKAMAL, HAROLD

It is certified that error appears in the above-identified patent and that said Letters Patent are hereby corrected as shown below:

| Patent Col. | Lines | | | |
|---|---|---|---|---|
| 8 | 32-38 | 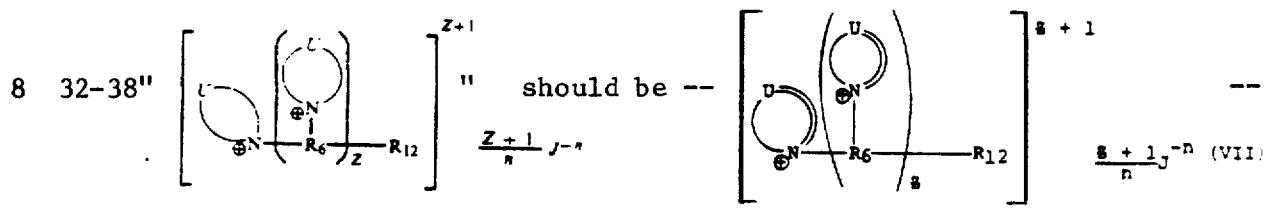 | should be | -- |
| 8 | 40, after "VII" | | should be | -- Z -- |
| 17 | 26 | "0.235" | should be | -- 0.148 -- |
| 18 | 17 | "62" | should be | -- 65 -- |
| 19 | 44 | "0.75" | should be | -- 0.75 phr -- (add "phr") |
| 21 | 30 | "3" | should be | -- 31 -- |
| 25 | 9-15 | 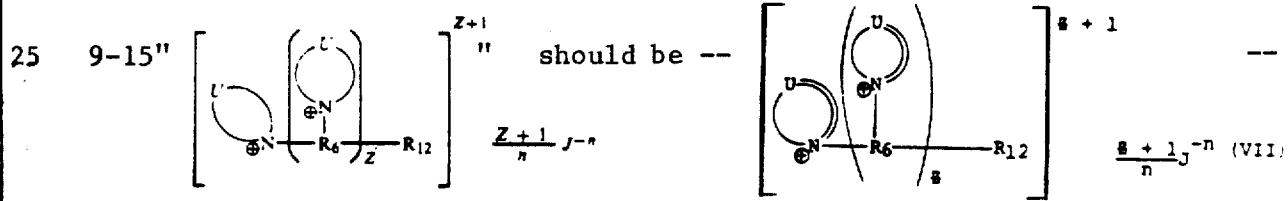 | should be | -- |
| 26 | 35 | "benzoisoquinolinium" | should be | -- benzo[H]isoquinolinium -- |
| 29 | 59-65 | 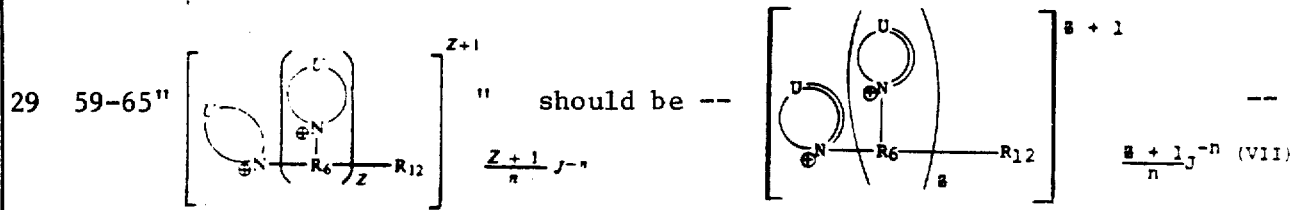 | should be | -- |

UNITED STATES PATENT OFFICE
CERTIFICATE OF CORRECTION  Page 2 of 2

Patent No. 4,431,755      Dated February 14, 1984

Inventor(s) WEBER, KENNETH E. - MUKAMAL, HAROLD

It is certified that error appears in the above-identified patent and that said Letters Patent are hereby corrected as shown below:

Patent

| Col. | Lines | | | |
|---|---|---|---|---|
| 30 | 46 | "R9" | should be | -- R9 and -- (add "and") |
| 31 | 4 | "alkenyl" | should be | -- alkylenyl -- |

33  38-44  "[formula with $Z+1$ exponent]"  should be  -- [formula with $s+1$ exponent] $\frac{s+1}{n} J^{-n}$ (VII) --

Signed and Sealed this

Fifth Day of June 1984

[SEAL]

Attest:

GERALD J. MOSSINGHOFF

Attesting Officer     Commissioner of Patents and Trademarks